(12) United States Patent
Florczyk et al.

(10) Patent No.: US 12,539,352 B2
(45) Date of Patent: Feb. 3, 2026

(54) FROZEN, POROUS THIN FILMS AND METHODS OF MAKING AND USE THEREOF

(71) Applicant: University of Central Florida Research Foundation, Inc., Orlando, FL (US)

(72) Inventors: Stephen J. Florczyk, Orlando, FL (US); Kailei Xu, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 919 days.

(21) Appl. No.: 17/599,753

(22) PCT Filed: Apr. 1, 2020

(86) PCT No.: PCT/US2020/026078
§ 371 (c)(1),
(2) Date: Sep. 29, 2021

(87) PCT Pub. No.: WO2020/205913
PCT Pub. Date: Oct. 8, 2020

(65) Prior Publication Data
US 2022/0152272 A1    May 19, 2022

Related U.S. Application Data

(60) Provisional application No. 62/828,785, filed on Apr. 3, 2019.

(51) Int. Cl.
*A61L 27/20* (2006.01)
*A61L 27/56* (2006.01)
*C12N 5/00* (2006.01)

(52) U.S. Cl.
CPC .............. *A61L 27/20* (2013.01); *A61L 27/56* (2013.01); *C12N 5/0062* (2013.01); *C12N 5/0068* (2013.01); *C12N 2513/00* (2013.01); *C12N 2533/72* (2013.01)

(58) Field of Classification Search
CPC ....... A61L 27/20; A61L 27/56; C12N 5/0062; C12N 5/0068; C12N 2513/00; C12N 2533/72
See application file for complete search history.

(56) References Cited

U.S. PATENT DOCUMENTS

| 6,391,471 B1 * | 5/2002 | Hiraoka | H10K 30/30 |
| | | | 428/626 |
| 2003/0003127 A1 | 1/2003 | Brown et al. | |
| 2009/0208586 A1 * | 8/2009 | Sajiki | A61L 31/146 |
| | | | 424/501 |
| 2014/0219962 A1 * | 8/2014 | Zhang | A61L 27/56 |
| | | | 435/375 |
| 2016/0287527 A1 | 10/2016 | Armbruster et al. | |
| 2019/0255745 A1 | 8/2019 | Ho et al. | |

FOREIGN PATENT DOCUMENTS

WO    WO-2017089960 A1 *  6/2017  ......... F28D 15/0233

OTHER PUBLICATIONS

International Search Report and Written Opinion mailed Jun. 11, 2020 in PCT/US2020/026078 (11 pages).

* cited by examiner

*Primary Examiner* — Robert A Wax
*Assistant Examiner* — John W Lippert, III
(74) *Attorney, Agent, or Firm* — Meunier Carlin & Curfman LLC

(57) ABSTRACT

Frozen, porous thin films and methods of making and use thereof are described herein. The frozen, porous thin films can comprise a continuous phase permeated by a plurality of pores; wherein the continuous phase comprises a polymer, a ceramic material, or a combination thereof. In some examples, the frozen, porous thin films are made by freeze casting.

18 Claims, 25 Drawing Sheets

FROZEN, POROUS THIN FILMS AND METHODS OF MAKING AND USE THEREOF

CROSS-REFERENCE TO RELATED APPLICATIONS

This application is a U.S. national stage application filed under 35 U.S.C. § 371 of PCT/US2020/026078 filed Apr. 1, 2020, which claims the benefit of priority to U.S. Provisional Application No. 62/828,785 filed Apr. 3, 2019, each of which is hereby incorporated herein by reference in its entirety.

BACKGROUND

Cancer therapies are evaluated with pre-clinical trials before they are approved for use in patients. Most of these trials are conducted on 2D plastic surfaces, which do not resemble the in vivo conditions. 3D biomaterial scaffolds better replicate in vivo conditions, but have other limitations for downstream cell analysis. The compositions and methods discussed herein address these and other needs.

SUMMARY

In accordance with the purposes of the disclosed compositions and methods, as embodied and broadly described herein, the disclosed subject matter relates to frozen, porous thin films and methods of making and use thereof.

Described herein are frozen, porous thin films comprising: a continuous phase permeated by a plurality of pores; wherein the continuous phase comprises a polymer, a ceramic material, or a combination thereof; wherein the plurality of pores have an average pore size of from 1 micrometer ($\mu$m) to 200 $\mu$m; and wherein the frozen, porous thin film has an average thickness of from 1 $\mu$m to 1000 $\mu$m.

In some examples, the average pore size of from 10 $\mu$m to 100 $\mu$m, from 20 $\mu$m to 100 $\mu$m, or from 20 $\mu$m to 60 $\mu$m. In some examples, the plurality of pores have an average pore size that is substantially homogeneous.

In some examples, the average thickness is from 10 $\mu$m to 1000 $\mu$m, from 10 $\mu$m to 500 $\mu$m, or from 10 $\mu$m to 200 $\mu$m. In some examples, the average thickness is from 20 $\mu$m to 1000 $\mu$m, from 20 $\mu$m to 500 $\mu$m, or from 20 $\mu$m to 200 $\mu$m.

In some examples, the frozen, porous thin film has an average porosity of 90% or more. In some examples, the frozen, porous thin film has an average porosity of 95% or more.

In some examples, the continuous phase comprises a polymer, the polymer comprising a biocompatible polymer. In some examples, the continuous phase comprises a polymer selected from the group consisting of chitosan, cellulose, alginate, collagen, gelatin, derivatives thereof, and combinations thereof. In some examples, the continuous phase comprises chitosan or a derivative thereof.

Also disclosed herein are methods of making the frozen, porous thin films described herein, such as by freeze casting.

Also disclosed herein are methods of making the frozen, porous thin films described herein, the methods comprising: depositing a solution comprising the polymer, the ceramic material, or a combination thereof on a substrate to form a coated substrate and freezing the coated substrate.

In some examples, the substrate comprises a glass coverslip. In some examples, the substrate comprises one or more wells of a well plate.

In some examples, the solution has a concentration of the polymer, the ceramic material, or a combination thereof of from 0.5% to 15%, from 0.5% to 10%, or from 0.5% to 2%. In some examples, the solution comprises an aqueous solution. In some examples, the solution comprises a chitosan solution. In some examples, the solution comprises a 2 wt % chitosan solution, a 1 wt % chitosan solution, or a 0.5 wt % chitosan solution.

In some examples, depositing the solution comprises depositing from 1 microliter to 1000 microliters, from 1 microliter to 500 microliters, or from 10 to 100 microliters of the solution. In some examples, depositing the solution comprises dip coating, spin coating, brushing, or a combination thereof.

In some examples, freezing the coated substrate comprises freezing the coated substrate: at a temperature of from 0° C. to −273° C.; for an amount of time of from 1 second to 24 hours; or a combination thereof. In some examples, the coated substrate is frozen at a temperature of −20° C. or less, −30° C. or less, −80° C., or −196° C. or less. In some examples, the coated substrate is frozen for an amount of time of from 1 minute to 18 hours, from 10 minutes to 12 hours, or from 30 minutes to 12 hours. In some examples, the coated substrate is frozen at a temperature of −20° C., −80° C., or −196° C. for an amount of time of 1 hour. In some examples, freezing the coated substrate comprises placing the coated substrate in a −20° C. freezer for an hour.

In some examples, the method further comprises freeze drying the frozen coated substrate. In some examples, the frozen coated substrate is freeze dried: at a temperature of from 0° C. to −120° C., for an amount of time of from 1 minute to 72 hours, or a combination thereof. In some examples, the frozen coated substrate is freeze-dried under vacuum at −86° C. for 24 hours.

In some examples, the method further comprises stabilizing the film after freezing and/or freeze drying. In some examples, stabilizing the film comprises neutralizing or crosslinking the film.

Also disclosed herein are methods of use of the frozen, porous thin films described herein as a biomaterial substrate or scaffold, a cell culture substrate or platform, or a combination thereof. In some examples, the method comprises using the frozen, porous thin film as a cell culture substrate for cancer cells. In some examples, the cancer cells comprise breast cancer cells. In some examples, the method comprises using the frozen, porous thin film as a biomaterial scaffold that is implanted in vivo.

Also disclosed herein are methods of use of the frozen, porous thin films described herein in energy or other applications.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
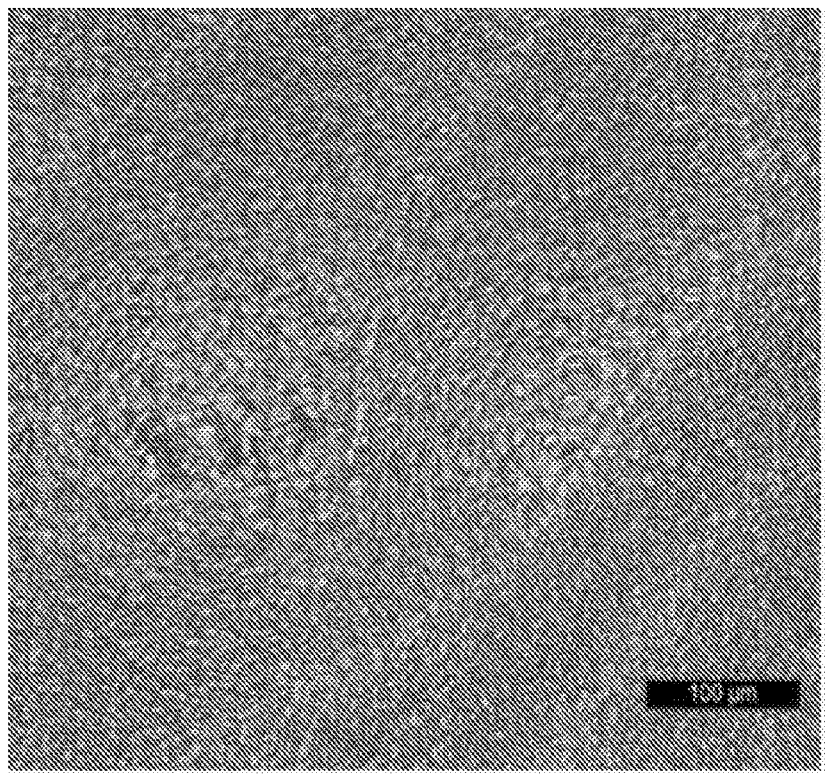
FIG. 1 is a brightfield image of frozen film morphology from 10 μL of a 1 wt % chitosan solution deposited and frozen at −20° C.
Figure 2:
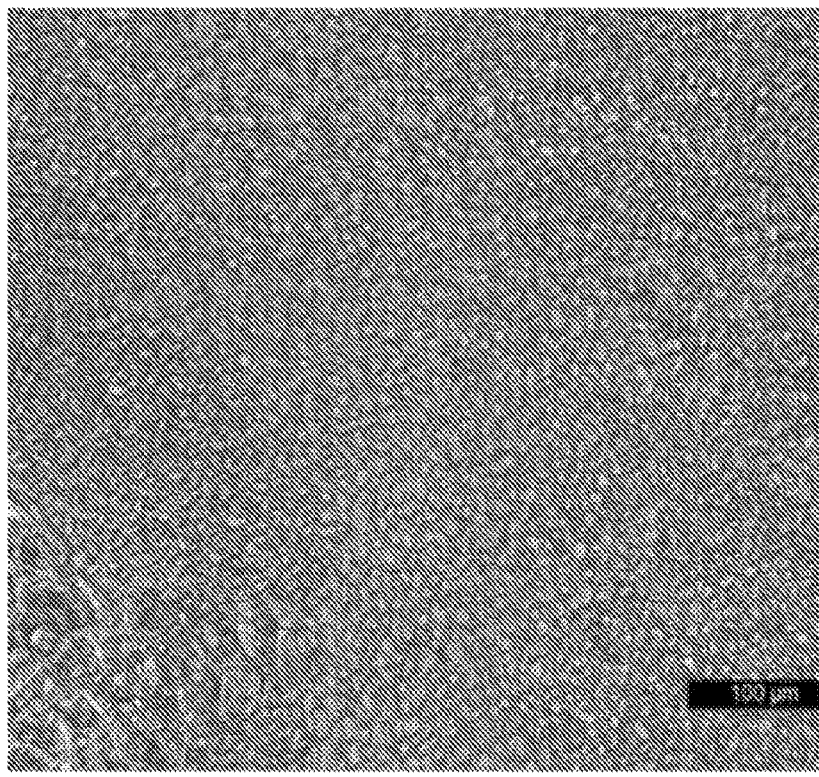
FIG. 2 is a brightfield image of frozen film morphology from 20 μL of a 1 wt % chitosan solution deposited and frozen at −20° C.
Figure 3:
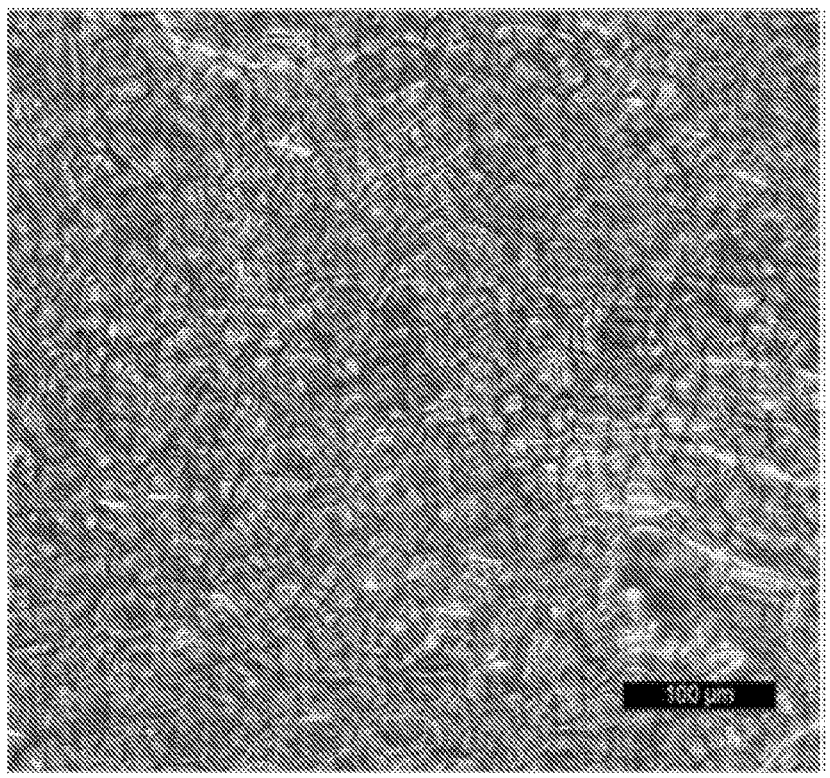
FIG. 3 is a brightfield image of frozen film morphology from 30 μL of a 1 wt % chitosan solution deposited and frozen at −20° C.
Figure 4:
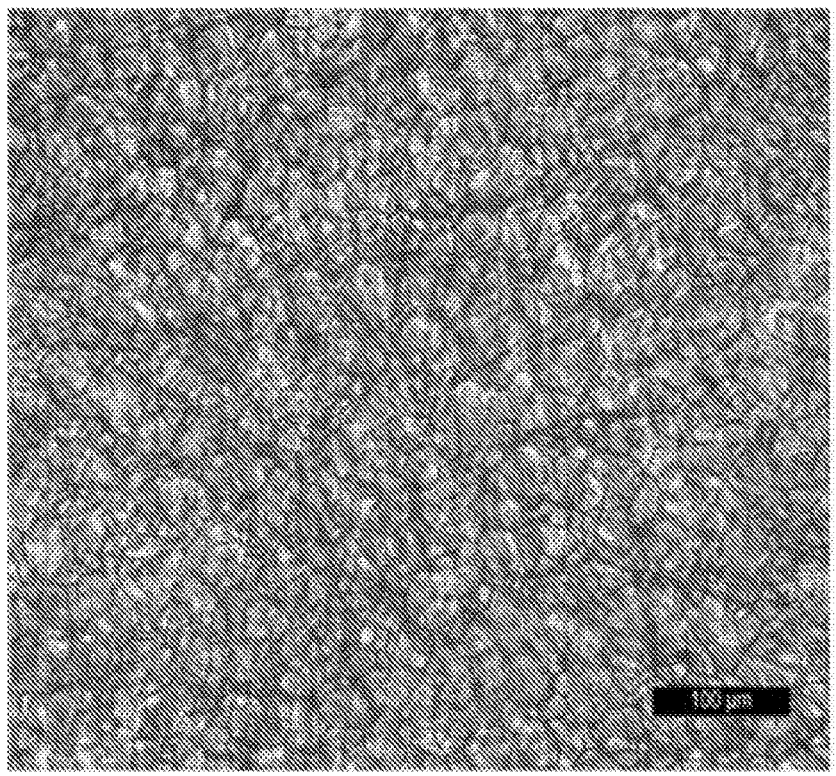
FIG. 4 is a brightfield image of frozen film morphology from 50 μL of a 1 wt % chitosan solution deposited and frozen at −20° C.
Figure 5:
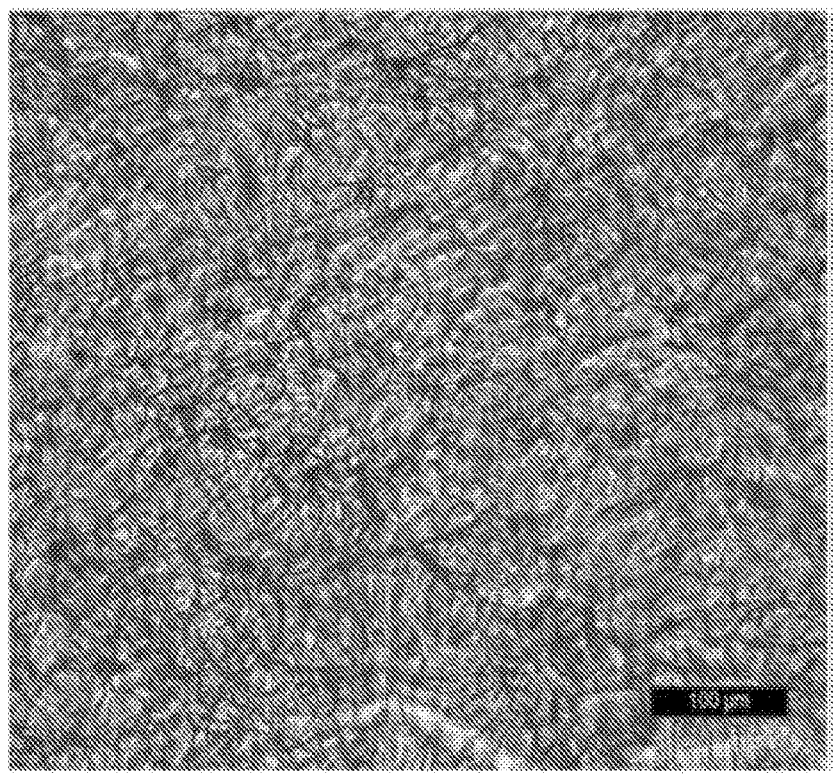
FIG. 5 is a brightfield image of frozen film morphology from 75 μL of a 1 wt % chitosan solution deposited and frozen at −20° C.
Figure 6:
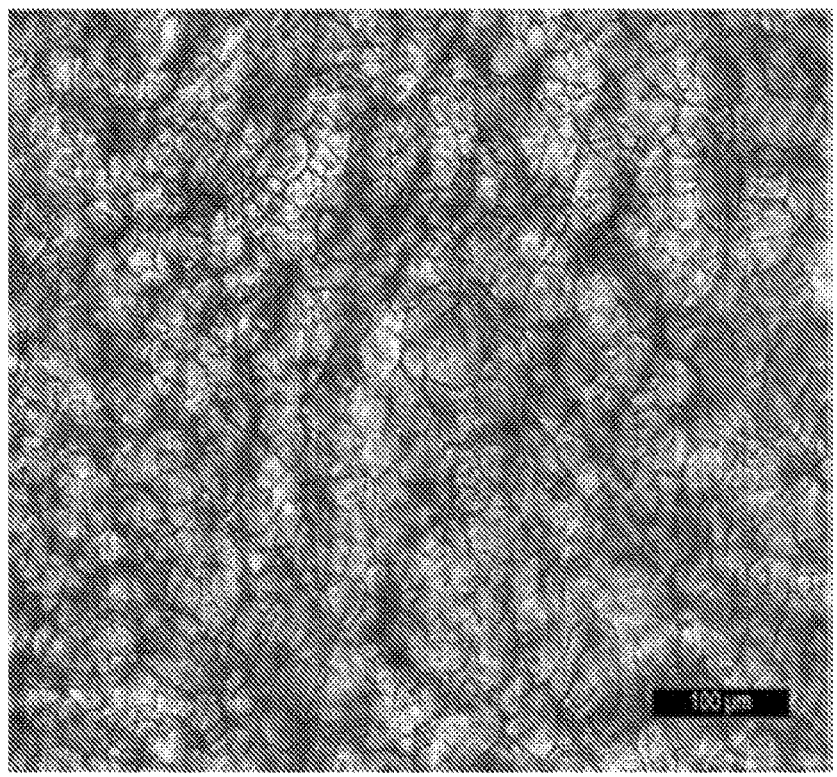
FIG. 6 is a brightfield image of frozen film morphology from 100 μL of a 1 wt % chitosan solution deposited and frozen at −20° C.
Figure 7:
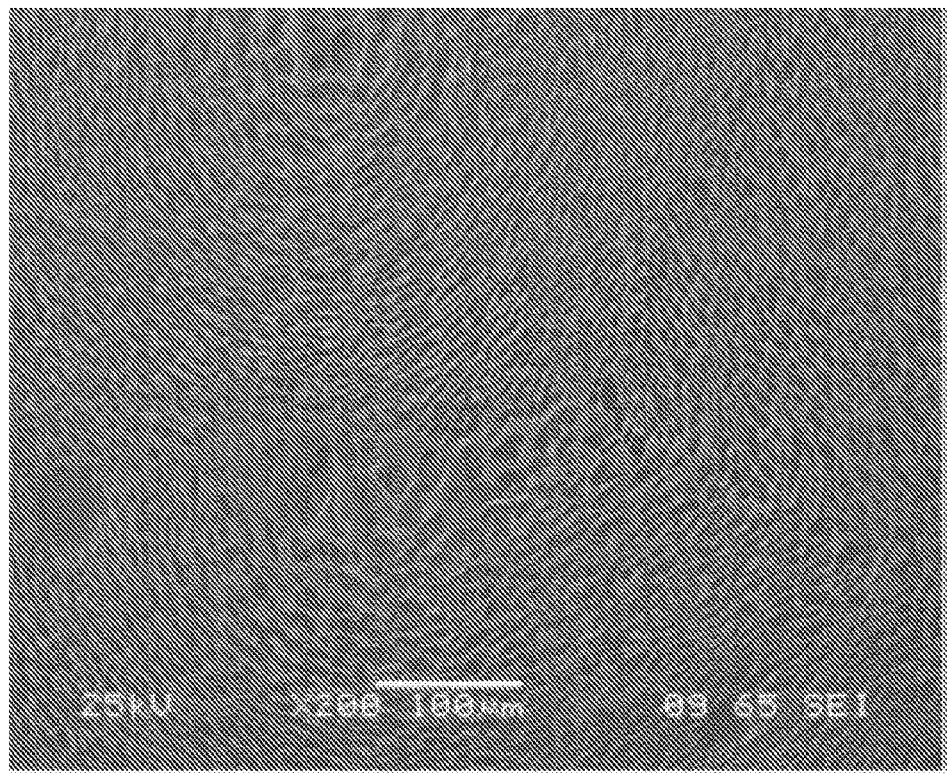
FIG. 7 is a scanning electron microscopy (SEM) image of frozen film morphology from 10 μL of a 1 wt % chitosan solution deposited and frozen at −20° C.
Figure 8:
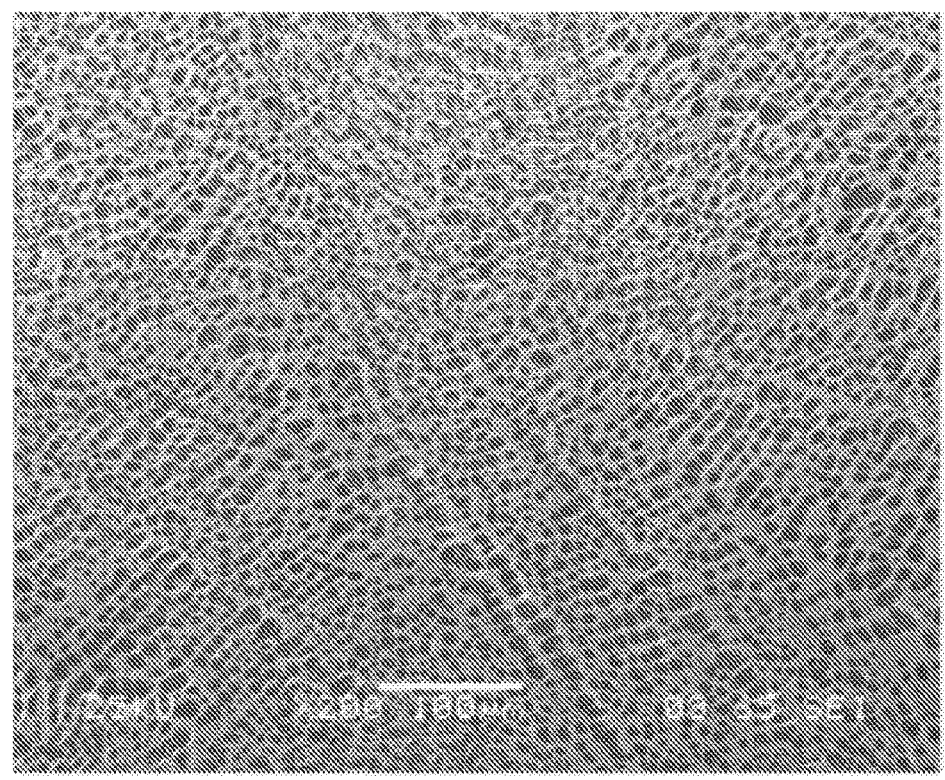
FIG. 8 is a SEM image of frozen film morphology from 20 μL of a 1 wt % chitosan solution deposited and frozen at −20° C.
Figure 9:
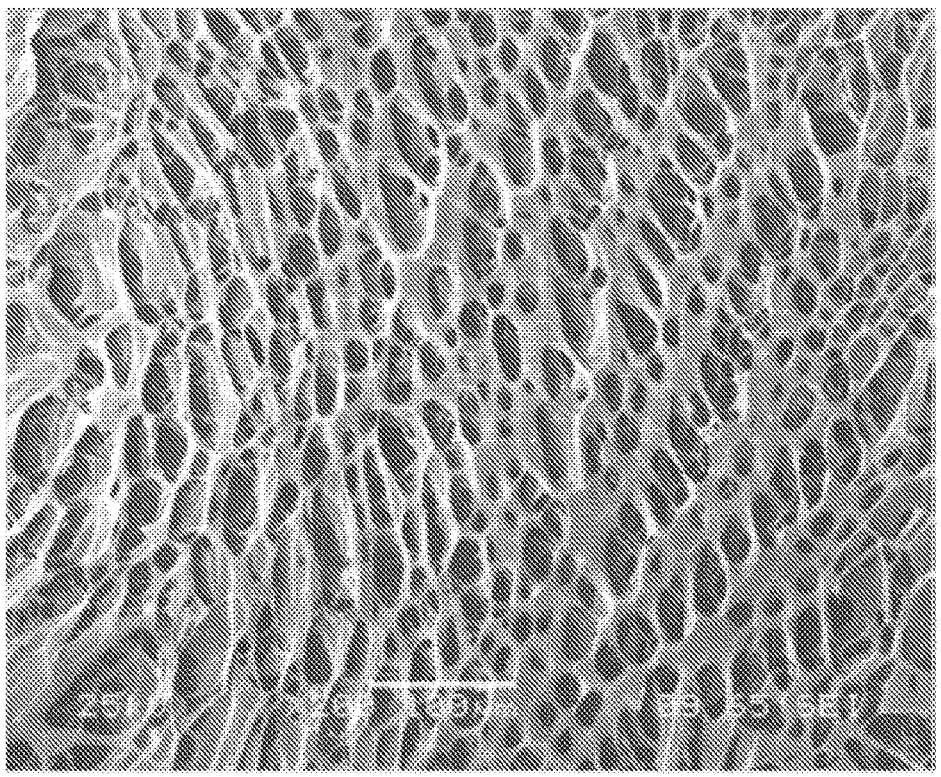
FIG. 9 is a SEM image of frozen film morphology from 30 μL of a 1 wt % chitosan solution deposited and frozen at −20° C.
Figure 10:
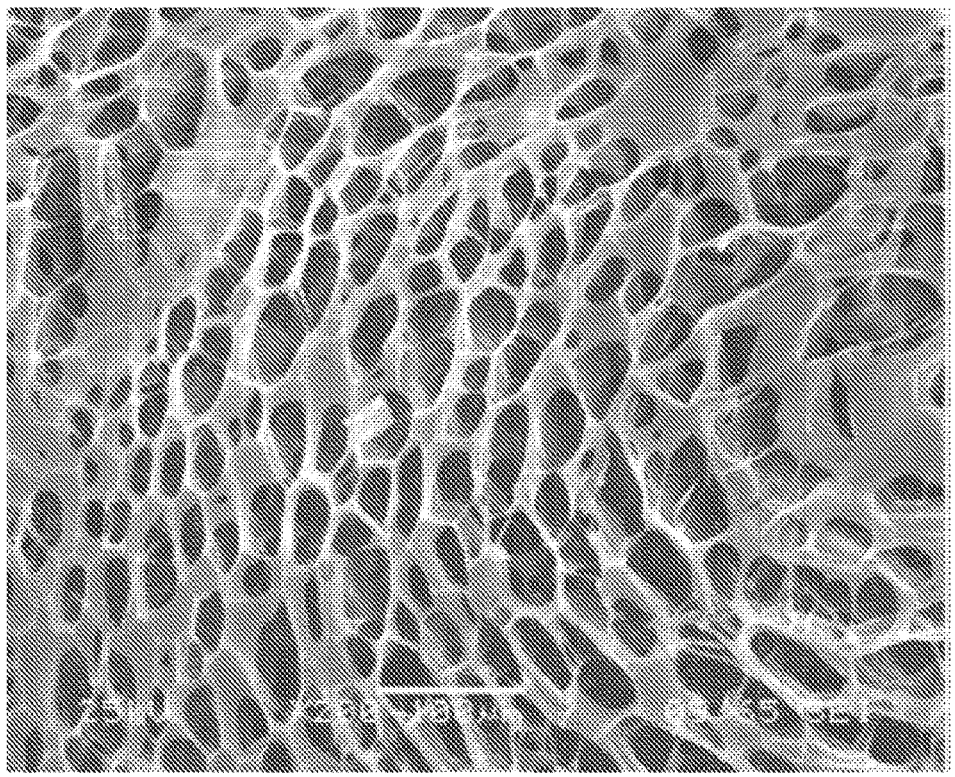
FIG. 10 is a SEM image of frozen film morphology from 50 μL of a 1 wt % chitosan solution deposited and frozen at −20° C.
Figure 11:
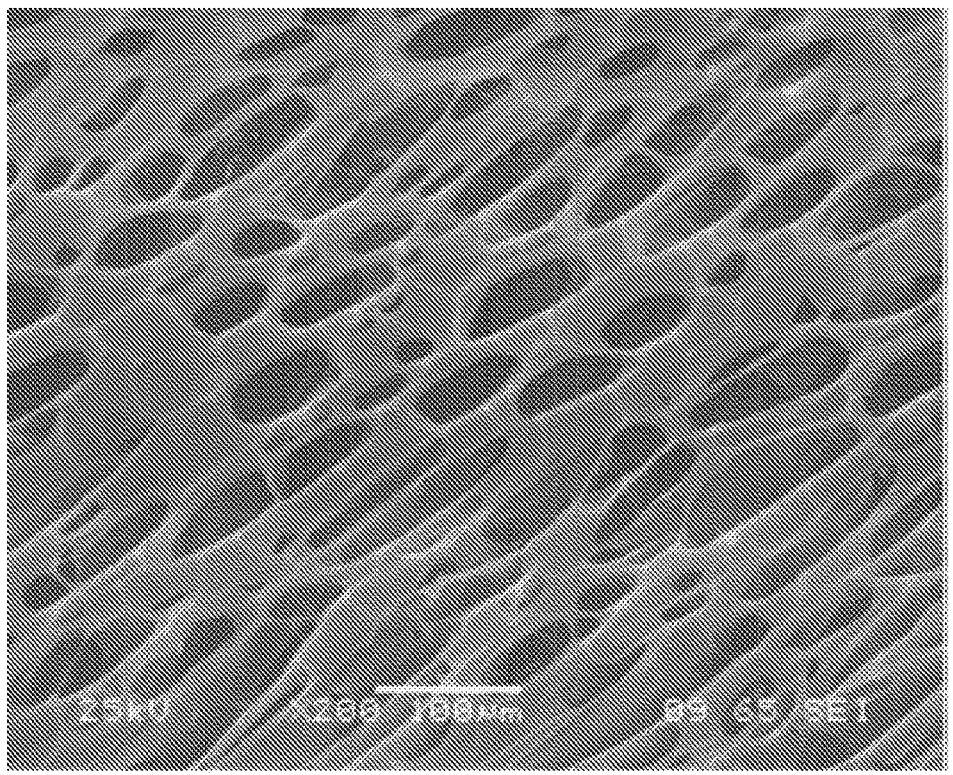
FIG. 11 is a SEM image of frozen film morphology from 75 μL of a 1 wt % chitosan solution deposited and frozen at −20° C.
Figure 12:
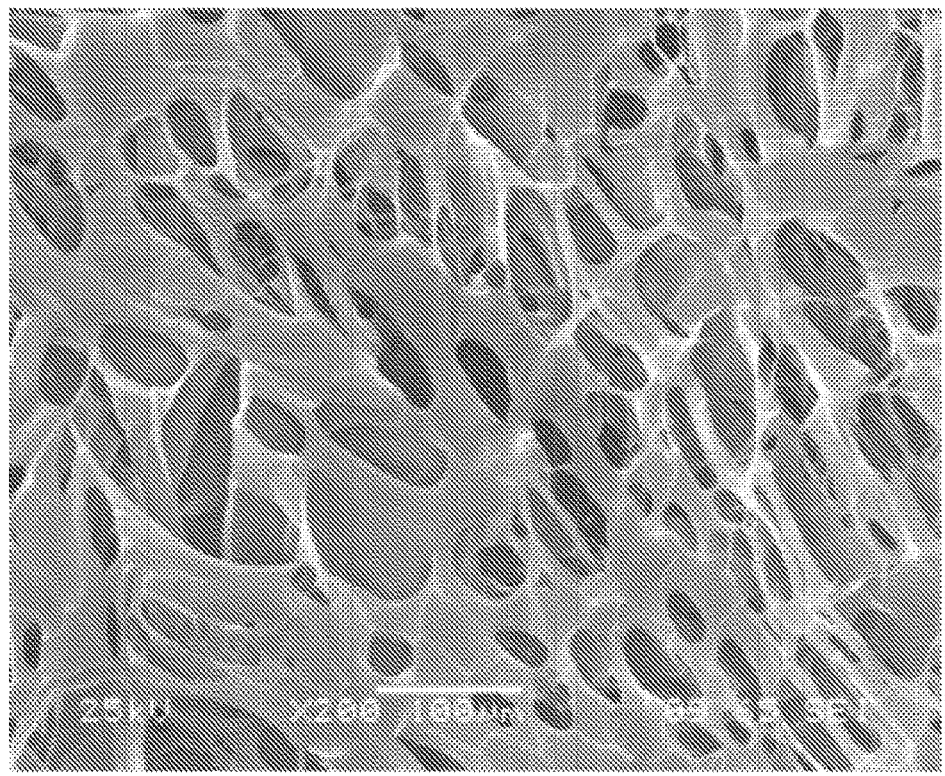
FIG. 12 is a SEM image of frozen film morphology from 100 μL of a 1 wt % chitosan solution deposited and frozen at −20° C.

The compositions and methods described herein may be understood more readily by reference to the following detailed description of specific aspects of the disclosed subject matter and the Examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

Described herein are frozen, porous thin films and methods of making and use thereof. For example, described herein are frozen, porous thin films comprising a continuous phase permeated by a plurality of pores.

"Phase," as used herein, generally refers to a region of a material having a substantially uniform composition which is a distinct and physically separate portion of a heterogeneous system. The term "phase" does not imply that the material making up a phase is a chemically pure substance, but merely that the chemical and/or physical properties of the material making up the phase are essentially uniform throughout the material, and that these chemical and/or physical properties differ significantly from the chemical and/or physical properties of another phase within the material. Examples of physical properties include density, thickness, aspect ratio, specific surface area, porosity and dimensionality. Examples of chemical properties include chemical composition.

"Continuous," as used herein, generally refers to a phase such that all points within the phase are directly connected, so that for any two points within a continuous phase, there exists a path which connects the two points without leaving the phase.

The continuous phase can, for example, comprise a polymer, a ceramic material, or a combination thereof. In some examples, the continuous phase comprises a polymer, such as any suitable polymer. In some example, the polymer can comprise a biocompatible polymer. Examples of polymers include, but are not limited to, chitin, alginate, collagen, gelatin, cellulose, poly(vinyl alcohol), pullulan, agarose, dextran, poly(acrylic acid), poly(ethylene oxide), poly(N-vinyl pyrrolidone), polyacrylamide, hyaluronic acid, chondroitin, maltodextrin, xanthan, scleroglucan, starch, albumin, poly-L-lysine, poly(hydroxyalkylmethacrylates), carboxypolymethylene, carbomer, polyvinylpyrrolidone, guar gum, gum arabic, gum karaya, gum ghatti, locust bean gum, tamarind gum, gellan gum, gum tragacanth, agar, pectin, gluten, ethylene vinyl alcohol, polyethylene glycol (PEG), derivatives thereof, and combinations thereof. In some examples, the polymer can comprise chitin or a derivative thereof. Examples of derivatives of chitin include, for example chitosan. In some examples, the polymer can comprise cellulose or a derivative thereof, such as hydroxymethylcellulose (HMC), hydroxyethylcellulose (HEC), hydroxypropylcellulose (HPC), methylcellulose (MC), ethylcellulose (EC), carboxyethylcellulose (CEC), ethylhydroxyethylcellulose (EHEC), carboxymethylhydroxyethylcellulose (CMHEC), hydroxypropylmethyl-cellulose (HPMC), hydroxypropylethylcellulose (HPEC), sodium carboxymethylcellulose (Na-CMC), and combinations thereof.

In some examples, the continuous phase comprises a polymer selected from the group consisting of chitosan, cellulose, alginate, collagen, gelatin, derivatives thereof, and combinations thereof. In some examples, the continuous phase comprises chitosan or a derivative thereof.

The plurality of pores can have an average pore size. As used herein "pore size" refers to the largest cross-sectional dimension of a pore in a plane perpendicular to the longitudinal axis of the pore. For example, in the case of a substantially cylindrical pore, the pore size would be the diameter of the pore. The average pore size can be determined, for example, using electron microscopy (e.g., scanning electron microscopy (SEM), scanning transmission electron microscopy (STEM)), Brunauer-Emmett-Teller (BET) measurements, porosimetry, or a combination thereof.

In some examples, the plurality of pores can have an average pore size of 1 micrometer ($\mu m$) or more (e.g., 2 $\mu m$ or more, 3 $\mu m$ or more, 4 $\mu m$ or more, 5 $\mu m$ or more, 6 $\mu m$ or more, 7 $\mu m$ or more, 8 $\mu m$ or more, 9 $\mu m$ or more, 10 $\mu m$ or more, 15 $\mu m$ or more, 20 $\mu m$ or more, 25 $\mu m$ or more, 30 $\mu m$ or more, 35 $\mu m$ or more, 40 $\mu m$ or more, 45 $\mu m$ or more, 50 $\mu m$ or more, 55 $\mu m$ or more, 60 $\mu m$ or more, 65 $\mu m$ or more, 70 $\mu m$ or more, 75 $\mu m$ or more, 80 $\mu m$ or more, 85 $\mu m$ or more, 90 $\mu m$ or more, 95 $\mu m$ or more, 100 $\mu m$ or more, 105 $\mu m$ or more, 110 $\mu m$ or more, 115 $\mu m$ or more, 120 $\mu m$ or more, 125 $\mu m$ or more, 130 $\mu m$ or more, 135 $\mu m$ or more, 140 $\mu m$ or more, 145 $\mu m$ or more, 150 $\mu m$ or more, 155 $\mu m$ or more, 160 $\mu m$ or more, 165 $\mu m$ or more, 170 $\mu m$ or more, 175 $\mu m$ or more, 180 $\mu m$ or more, 185 $\mu m$ or more, or 190 $\mu m$ or more).

In some examples, the plurality of pores can have an average pore size of 200 $\mu m$ or less (e.g., 195 $\mu m$ or less, 190 $\mu m$ or less, 185 $\mu m$ or less, 180 $\mu m$ or less, 175 $\mu m$ or less, 170 $\mu m$ or less, 165 $\mu m$ or less, 160 $\mu m$ or less, 155 $\mu m$ or less, 150 $\mu m$ or less, 145 $\mu m$ or less, 140 $\mu m$ or less, 135 $\mu m$ or less, 130 $\mu m$ or less, 125 $\mu m$ or less, 120 $\mu m$ or less, 115 $\mu m$ or less, 110 $\mu m$ or less, 105 $\mu m$ or less, 100 $\mu m$ or less, 95 $\mu m$ or less, 90 $\mu m$ or less, 85 $\mu m$ or less, 80 $\mu m$ or less, 75 $\mu m$ or less, 70 $\mu m$ or less, 65 $\mu m$ or less, 60 $\mu m$ or less, 55 $\mu m$ or less, 50 $\mu m$ or less, 45 $\mu m$ or less, 40 $\mu m$ or less, 35 $\mu m$ or less, 30 $\mu m$ or less, 25 $\mu m$ or less, 20 $\mu m$ or less, 15 $\mu m$ or less, 10 $\mu m$ or less, 9 $\mu m$ or less, 8 $\mu m$ or less, 7 $\mu m$ or less, 6 $\mu m$ or less, or 5 $\mu m$ or less).

The average pore size of the plurality of pores can range from any of the minimum values described above to any of the maximum values described above. For example, the plurality of pores can have an average pore size of from 1 micrometer (μm) to 200 μm (e.g., from 1 μm to 100 μm, from 100 μm to 200 μm, from 1 μm to 40 μm, from 40 μm to 80 μm, from 80 μm to 120 μm, from 120 μm to 160 μm, from 160 μm to 200 μm, from 10 μm to 200 μm, from 1 μm to 150 μm, from 10 μm to 150 μm, from 10 μm to 100 μm, from 20 μm to 100 μm, from 20 μm to 80 μm, or from 20 μm to 60 μm).

In some examples, the plurality of pores can have an average pore size that is substantially monodisperse. "Monodisperse" and "homogeneous size distribution," as used herein, and generally describe a population of pores where all of the pores are the same or nearly the same size. As used herein, a monodisperse distribution refers to pore size distributions in which 80% of the distribution (e.g., 85% of the distribution, 90% of the distribution, or 95% of the distribution) lies within 25% of the median pore size (e.g., within 20% of the median pore size, within 15% of the median pore size, within 10% of the median pore size, or within 5% of the median pore size).

The frozen, porous films comprise a plurality of pores, such that the frozen films can have a highly porous structure. For example, the frozen, porous thin films can have an average porosity of 90% or more (e.g., 91% or more, 92% or more, 93% or more, 94% or more, 95% or more, 96% or more, 97% or more, 98% or more, or 99% or more).

The frozen, porous thin film have an average thickness. The average thickness of the frozen, porous thin film can be determined by methods known in the art, for example profilometry, cross-sectional electron microscopy, atomic force microscopy (AFM), ellipsometry, veneer calipers, micrometer gauges, or combinations thereof.

The frozen, porous thin film can, for example, have an average thickness of 1 μm or more (e.g., 2 μm or more, 3 μm or more, 4 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 55 μm or more, 60 μm or more, 65 μm or more, 70 μm or more, 75 μm or more, 80 μm or more, 85 μm or more, 90 μm or more, 95 μm or more, 100 μm or more, 105 μm or more, 110 μm or more, 115 μm or more, 120 μm or more, 125 μm or more, 130 μm or more, 135 μm or more, 140 μm or more, 145 μm or more, 150 μm or more, 155 μm or more, 160 μm or more, 165 μm or more, 170 μm or more, 175 μm or more, 180 μm or more, 185 μm or more, 190 μm or more, 195 μm or more, 200 μm or more, 210 μm or more, 220 μm or more, 230 μm or more, 240 μm or more, 250 μm or more, 260 μm or more, 270 μm or more, 280 μm or more, 290 μm or more, 300 μm or more, 325 μm or more, 350 μm or more, 375 μm or more, 400 μm or more, 425 μm or more, 450 μm or more, 475 μm or more, 500 μm or more, 525 μm or more, 550 μm or more, 575 μm or more, 600 μm or more, 650 μm or more, 700 μm or more, 750 μm or more, 800 μm or more, 850 μm or more, or 900 μm or more).

In some examples, the frozen, porous thin film can have an average thickness of 1000 μm or less (e.g., 950 μm or less, 900 μm or less, 850 μm or less, 800 μm or less, 750 μm or less, 700 μm or less, 650 μm or less, 600 μm or less, 575 μm or less, 550 μm or less, 525 μm or less, 500 μm or less, 475 μm or less, 450 μm or less, 425 μm or less, 400 μm or less, 375 μm or less, 350 μm or less, 325 μm or less, 300 μm or less, 290 μm or less, 280 μm or less, 270 μm or less, 260 μm or less, 250 μm or less, 240 μm or less, 230 μm or less, 220 μm or less, 210 μm or less, 200 μm or less, 195 μm or less, 190 μm or less, 185 μm or less, 180 μm or less, 175 μm or less, 170 μm or less, 165 μm or less, 160 μm or less, 155 μm or less, 150 μm or less, 145 μm or less, 140 μm or less, 135 μm or less, 130 μm or less, 125 μm or less, 120 μm or less, 115 μm or less, 110 μm or less, 105 μm or less, 100 μm or less, 95 μm or less, 90 μm or less, 85 μm or less, 80 μm or less, 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, or 5 μm or less).

The average thickness of the frozen, porous thin film can range from any of the minimum values described above to any of the maximum values described above. For example, the frozen, porous thin film can have an average thickness of from 1 μm to 1000 μm (e.g., from 1 μm to 10 μm, from 10 μm to 100 μm, from 100 μm to 1000 μm, from 1 μm to 750 μm, from 10 μm to 500 μm, from 10 μm to 200 μm, from 20 μm to 1000 μm, from 20 μm to 500 μm, or from 20 μm to 200 μm). In some examples, the average pore size can increase with increasing average film thickness, such that the average thickness can be selected in view of the desired average pore size.

In some examples, the frozen films are freeze cast polymeric thin films. In some examples, the films described herein can be produced from a chitosan solution (e.g., a 1 wt % chitosan solution, or a 0.5 wt % chitosan solution). In some examples, the films can comprise alginate, carboxymethyl chitosan, collagen, gelatin, or combination thereof. In some examples, the frozen films can be freeze casted from a ceramic suspension. The frozen films can have a highly porous structure, with pore size increasing with increasing film thickness. The pore structure across the film can be fairly homogeneous, however, in some examples, there can be regions of heterogeneity.

Also disclosed herein are methods of making the frozen, porous thin films described herein. The films described herein can be made, for example, by freeze casting.

In some examples, the methods of making the frozen, porous thin films described herein can comprise depositing a solution comprising the polymer, the ceramic material, or a combination thereof on a substrate to form a coated substrate and freezing the coated substrate. The substrate can comprise any suitable substrate. Examples of suitable substrates include, but are not limited to, polymers (e.g., porous polymers), glass fibers, glass, quartz, silicon, and combinations thereof. In some examples, the substrate can comprise a glass coverslip. In some examples, the substrate can comprise one or more wells of a well plate.

The concentration of the polymer, the ceramic material, or combination thereof in the solution can, for example, be 0.1% (% w/v) or more (e.g., 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.6% or more, 1.7% or more, 1.8% or more, 1.9% or more, 2% or more, 2.25% or more, 2.5% or more, 2.75% or more, 3% or more, 3.25% or more, 3.5% or more, 3.75% or more, 4% or more, 4.25% or more, 4.5% or more, 4.75% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, or 14% or more). In some examples, the solution can have a concentration of 15% or less (e.g., 14.5% or less, 14% or less, 13.5% or less, 13% or less, 12.5% or less, 12% or less, 11.5% or less, 11% or less, 10.5% or less, 10% or less, 9.5% or less, 9% or less, 8.5% or less, 8% or less, 7.5% or less, 7% or less, 6.5% or less, 6% or less, 5.5% or less, 5% or less, 4.75% or less, 4.5% or less, 4.25% or less, 4% or less, 3.75% or less, 3.5% or less, 3.25% or less, 3% or less, 2.75% or less, 2.5% or less, 2.25% or less, 2% or less, 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, or 0.5% or less).

The concentration of the solution can range from any of the minimum values described above to any of the maximum values described above. For example, the solution can have a concentration of the polymer, the ceramic material, or a combination thereof of from 0.1% to 15% (e.g., from 0.1 to 75%, from 7.5% to 15%, from 0.1% to 4%, from 5% to 10%, from 10% to 15%, from 0.5% to 15%, from 0.5% to 10%, from 0.5% to 5%, from 0.5% to 2%, or from 0.1% to 1%).

In some examples, the solution can comprise an aqueous solution. In some examples, the solution can comprise a chitosan solution, such as a 2 wt % chitosan solution, a 1 wt % chitosan solution, or a 0.5 wt % chitosan solution.

Depositing the solution can, for example, comprise printing, spin coating, drop-casting, zone casting, dip coating, blade coating, spraying, vacuum filtration, slot die coating, curtain coating, brush coating, or combinations thereof. In some examples, depositing the solution can comprise dip coating, spin coating, brush coating, or a combination thereof.

Depositing the solution can comprise depositing a volume of the solution. The volume of the solution deposited can be selected, for example, in view of the desired thickness of the frozen, porous thin film. For example, 1 microliter (µL) or more of the solution can be deposited (e.g., 2 µL or more, 3 µL or more, 4 µL or more, 5 µL or more, 6 µL or more, 7 µL or more, 8 µL or more, 9 µL or more, 10 µL more, 15 µL more, 20 µL more, 25 µL more, 30 µL or more, 35 µL more, 40 µL more, 45 µL more, 50 µL more, 55 µL more, 60 µL more, 65 µL more, 70 µL more, 75 µL more, 80 µL more, 85 µL more, 90 µL more, 95 µL more, 100 µL more, 110 µL more, 120 µL more, 130 µL more, 140 µL more, 150 µL more, 160 µL more, 170 µL more, 180 µL more, 190 µL more, 200 µL more, 225 µL more, 250 µL more, 275 µL more, 300 µL more, 325 µL more, 350 µL more, 375 µL more, 400 µL more, 425 µL more, 450 µL more, 475 µL more, 500 µL more, 550 µL more, 600 µL more, 650 µL more, 700 µL more, 750 µL more, 800 µL more, 850 µL more, or 900 µL more).

In some examples, 1000 µL less of the solution can be deposited (e.g., 950 µL less, 900 µL less, 850 µL less, 800 µL less, 750 µL less, 700 µL less, 650 µL less, 600 µL less, 550 µL less, 500 µL less, 475 µL less, 450 µL less, 425 µL less, 400 µL less, 375 µL less, 350 µL less, 325 µL less, 300 µL less, 275 µL less, 250 µL less, 225 µL less, 200 µL less, 190 µL less, 180 µL less, 170 µL less, 160 µL less, 150 µL less, 140 µL less, 130 µL less, 120 µL less, 110 µL less, 100 µL less, 95 µL less, 90 µL less, 85 µL less, 80 µL less, 75 µL less, 70 µL less, 65 µL less, 60 µL less, 55 µL less, 50 µL less, 45 µL less, 40 µL less, 35 µL less, 30 µL less, 25 µL less, 20 µL less, 15 µL less, 10 µL less, 9 µL or less, 8 µL less, 7 µL or less, 6 µL or less, or 5 µL or less).

The volume of the solution deposited can range from any of the minimum values described above to any of the maximum values described above. For example, depositing the solution can comprise depositing from 1 microliter to 1000 microliters of the solution (e.g., from 1 µL to 10 µL, from 10 µL to 100 µL, from 100 µL to 1000 µL, from 1 µL to 750 µL, from 1 µL to 500 µL, from 1 µL to 250 µL, from 1 µL to 100 µL, or from 10 µL to 100 µL).

In some examples, the coated substrate can be frozen at a temperature of 0° C. or less (e.g., −5° C. or less, −10° C. or less, −15° C. or less, −20° C. or less, −25° C. or less, −30° C. or less, −35° C. or less, −40° C. or less, −45° C. or less, −50° C. or less, −55° C. or less, −60° C. or less, −65° C. or less, −70° C. or less, −75° C. or less, −80° C. or less, −85° C. or less, −90° C. or less, −95° C. or less, −100° C. or less, −105° C. or less, −110° C. or less, −115° C. or less, −120° C. or less, −125° C. or less, −130° C. or less, −135° C. or less, −140° C. or less, −145° C. or less, −150° C. or less, −155° C. or less, −160° C. or less, −165° C. or less, −170° C. or less, −175° C. or less, −180° C. or less, −185° C. or less, −190° C. or less, −195° C. or less, −200° C. or less, −210° C. or less, −220° C. or less, −230° C. or less, −240° C. or less, −250° C. or less, or −260° C. or less).

In some examples, the coated substrate can be frozen at a temperature of −273° C. or more (e.g., −270° C. or more, −260° C. or more, −250° C. or more, −240° C. or more, −230° C. or more, −220° C. or more, −210° C. or more, −200° C. or more, −195° C. or more, −190° C. or more, −185° C. or more, −180° C. or more, −175° C. or more, −170° C. or more, −165° C. or more, −160° C. or more, −155° C. or more, −150° C. or more, −145° C. or more, −140° C. or more, −135° C. or more, −130° C. or more, −125° C. or more, −120° C. or more, −115° C. or more, −110° C. or more, −105° C. or more, −100° C. or more, −95° C. or more, −90° C. or more, −85° C. or more, −80° C. or more, −75° C. or more, −70° C. or more, −65° C. or more, −60° C. or more, −55° C. or more, −50° C. or more, −45° C. or more, −40° C. or more, −35° C. or more, −30° C. or more, −25° C. or more, −20° C. or more, −15° C. or more, or −10° C. or more).

The temperature at which the coated sample is frozen can range from any of this minimum values described above to any of the maximum values described above. For example, the coated substrate can be frozen at a temperature of from 0° C. to −273° C. (e.g., from 0° C. to −135° C., from −135° C. to −273° C., from 0° C. to −50° C., from −50° C. to −100° C., from −100° C. to −150° C., from −150° C. to −200° C., from −200° C. to −273° C., from −20° C. to −273° C., from −30° C. to −273° C., from −80° C. to −273° C., from −196° C. to −273° C., or from −20° C. to −200° C.).

In some examples, the coated substrate can be frozen for an amount of time of 1 second or more (e.g., 5 seconds or more, 10 seconds or more, 15 seconds or more, 20 seconds or more, 25 seconds or more, 30 seconds or more, 35 seconds or more, 40 seconds or more, 45 seconds or more, 50 seconds or more, 55 seconds or more, 1 minute or more, 1.5 minutes or more, 2 minutes or more, 2.5 minutes or more, 3 minutes or more, 3.5 minutes or more, 4 minutes or more, 4.5 minutes or more, 5 minutes or more, 6 minutes or more, 7 minutes or more, 8 minutes or more, 9 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 1 hour or more, 1.5 hours or more, 2 hours or more, 2.5 hours or more, 3 hours or more, 3.5 hours or more, 4 hours or more, 4.5 hours or more, 5 hours or more, 6 hours or more, 7 hours or more, 8 hours or more, 9 hours or more, 10 hours or more, 11 hours or more, 12 hours or more, 14 hours or more, 16 hours or more, 18 hours or more, 20 hours or more, or 22 hours or more).

In some examples, the coated substrate can be frozen for an amount of time of 24 hours or less (e.g., 22 hours or less, 20 hours or less, 18 hours or less, 16 hours or less, 14 hours or less, 12 hours or less, 11 hours or less, 10 hours or less, 9 hours or less, 8 hours or less, 7 hours or less, 6 hours or less, 5 hours or less, 4.5 hours or less, 4 hours or less, 3.5 hours or less, 3 hours or less, 2.5 hours or less, 2 hours or less, 1.5 hours or less, 1 hour or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 9 minutes or less, 8 minutes or less, 7 minutes or less, 6 minutes or less, 5 minutes or less, 4.5 minutes or less, 4 minutes or less, 3.5 minutes or less, 3 minutes or less, 2.5 minutes or less, 2 minutes or less, 1.5 minutes or less, 1 minute or less, 55 seconds or less, 50 seconds or less, 45 seconds or less, 40 seconds or less, 35 seconds or less, 30 seconds or less, 25 seconds or less, 20 seconds or less, 15 seconds or less, 10 seconds or less, or 5 seconds or less).

The time for which the coated sample is frozen can range from any of the minimum values described above to any of the maximum values described above. For example, the coated substrate can be frozen for an amount of time of from 1 second to 24 hours (e.g., from 1 second to 1 minute, from 1 minute to 1 hour, from 1 hour to 24 hours, from 1 minute to 18 hours, from 10 minutes to 12 hours, or from 30 minutes to 12 hours).

Freezing the coated substrate can, for example, comprise freezing the coated substrate at a temperature for an amount of time. In some examples, freezing the coated substrate comprises freezing the coated substrate at a temperature of from 0° C. to −273° C. (e.g., at a temperature of −20° C. or less, −30° C. or less, −80° C., or −196° C. or less) for an amount of time of from 1 second to 24 hours (e.g., from 1 minute to 18 hours, from 10 minutes to 12 hours, or from 30 minutes to 12 hours). In some examples, the coated substrate is frozen at a temperature of −20° C., −80° C., or −196° C. for 1 hour. In some examples, freezing the coated substrate comprises freezing the coated substrate at −20° C. for an hour.

Any suitable method or apparatus for freezing can be used, such as those known in the art. In some examples, freezing the coated substrate can comprise placing the coated substrate in a freezer, using a freezing stage, using a cold finger set up, or any combination thereof.

The methods can further comprise, for example, freeze drying the frozen coated substrate. In some examples, the frozen coated substrate is freeze dried at a temperature of 0° C. or less (e.g., −5° C. or less, −10° C. or less, −15° C. or less, −20° C. or less, −25° C. or less, −30° C. or less, −35° C. or less, −40° C. or less, −45° C. or less, −50° C. or less, −55° C. or less, −60° C. or less, −65° C. or less, −70° C. or less, −75° C. or less, −80° C. or less, −85° C. or less, −90° C. or less, −95° C. or less, −100° C. or less, −105° C. or less, or −110° C. or less). In some examples, the frozen coated substrate can be freeze dried at a temperature of −120° C. or more (e.g., −115° C. or more, −110° C. or more, −105° C. or more, −100° C. or more, −95° C. or more, −90° C. or more, −85° C. or more, −80° C. or more, −75° C. or more, −70° C. or more, −65° C. or more, −60° C. or more, −55° C. or more, −50° C. or more, −45° C. or more, −40° C. or more, −35° C. or more, −30° C. or more, −25° C. or more, −20° C. or more, −15° C. or more, or −10° C. or more).

The temperature at which the frozen coated sample is freeze dried can range from any of this minimum values described above to any of the maximum values described above. For example, the coated substrate can be frozen at a temperature of from 0° C. to −120° C. (e.g., from 0° C. to −60° C., from −60° C. to −120° C., from 0° C. to −40° C., from −40° C. to −80° C., from −80° C. to −120° C., from −10° C. to −120° C., from 0° C. to −110° C., from −10° C. to −110° C., or from −80° C. to −90° C.).

In some examples, the frozen coated substrate can be freeze dried for an amount of time of 1 minute or more (e.g., 1.5 minutes or more, 2 minutes or more, 2.5 minutes or more, 3 minutes or more, 3.5 minutes or more, 4 minutes or more, 4.5 minutes or more, 5 minutes or more, 6 minutes or more, 7 minutes or more, 8 minutes or more, 9 minutes or more, 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 1 hour or more, 1.5 hours or more, 2 hours or more, 2.5 hours or more, 3 hours or more, 3.5 hours or more, 4 hours or more, 4.5 hours or more, 5 hours or more, 6 hours or more, 7 hours or more, 8 hours or more, 9 hours or more, 10 hours or more, 11 hours or more, 12 hours or more, 14 hours or more, 16 hours or more, 18 hours or more, 20 hours or more, 22 hours or more, 24 hours or more, 30 hours or more, 36 hours or more, 42 hours or more, 48 hours or more, 54 hours or more, 60 hours or more, or 66 hours or more).

In some examples, the frozen coated substrate can be freeze dried for an amount of time of 72 hours or less (e.g., 66 hours or less, 60 hours or less, 54 hours or less, 48 hours or less, 42 hours or less, 36 hours or less, 30 hours or less, 24 hours or less, 22 hours or less, 20 hours or less, 18 hours or less, 16 hours or less, 14 hours or less, 12 hours or less, 11 hours or less, 10 hours or less, 9 hours or less, 8 hours or less, 7 hours or less, 6 hours or less, 5 hours or less, 4.5 hours or less, 4 hours or less, 3.5 hours or less, 3 hours or less, 2.5 hours or less, 2 hours or less, 1.5 hours or less, 1 hour or less, 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 9 minutes or less, 8 minutes or less, 7 minutes or less, 6 minutes or less, 5 minutes or less, 4.5 minutes or less, 4 minutes or less, 3.5 minutes or less, 3 minutes or less, 2.5 minutes or less, or 2 minutes or less).

The time for which the frozen coated sample is freeze dried can range from any of the minimum values described above to any of the maximum values described above. For example, the coated substrate can be frozen for an amount of time of from 1 minute to 72 hours (e.g., from 1 minute to 1 hour, from 1 hour to 24 hours, from 24 hours to 72 hours, from 1 minute to 24 hours, from 1 minute to 30 minutes, or from 15 minutes to 24 hours).

In some examples, the frozen coated substrate is freeze dried at a temperature of from 0° C. to −120° C. for an amount of time of from 1 minute to 72 hours. In some examples, the frozen coated substrate is freeze-dried under vacuum at a temperature of −86° C. for 24 hours.

The methods can further comprise, for example, stabilizing the film after freezing and/or freeze drying. Stabilizing the film can, for example, comprise neutralizing or cross-linking the film.

The methods of making the films described herein can, in some example, comprise freeze casting. For example, the methods of making the films described herein can applying an amount (e.g., 10-100 μL) of a polymer solution to a glass coverslip and spreading the applied polymer solution across the coverslip (e.g., with a foam brush). In some examples, the glass coverslip can be supported by a piece of aluminum foil, and the methods can further comprise placing the glass coverslip upon a piece of aluminum foil. The methods can further comprise transferring the glass coverslip coated with the polymer solution to a −20° C. freezer and freezing the coated coverslip for 1 hour for form the frozen film. After freezing, the methods can further comprise loading the frozen films into a freeze drier to remove ice crystals. The films can be freeze dried for several hours. The methods can further comprise removing the dried, frozen films from the freeze drier and then neutralizing or crosslinking the dried, frozen film to stabilize the polymer structure.

Also disclosed herein are methods of use of the frozen, porous thin films described herein. For example, the frozen, porous thin films can be used as a biomaterial substrate or scaffold, a cell culture substrate or platform, or a combination thereof. In some examples, the methods can comprise using the frozen, porous thin film as a cell culture substrate for cancer cells, such as breast cancer cells. In some examples, the methods can comprise using the frozen, porous thin film as a biomaterial scaffold, for example a biomaterial scaffold that is implanted in vivo. For example, the frozen, porous thin films can be used as a cell culture platform or biomaterial substrate, e.g., as a cell culture substrate in 96-well cell cultures for pre-clinical drug screening or screening of other therapies.

Also disclosed herein are methods of use of the frozen, porous thin films in energy or other applications.

In some examples, the average thickness of the frozen, porous thin films can be selected in view of the intended use of the frozen, porous thin film. In some examples, the frozen, porous thin films can further be modified, and the modification can be selected in view of the intended use of the frozen, porous thin film.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Described herein are frozen films which comprise highly porous thin films and can be used as a biomaterial substrate and in other application areas. The Frozen Films described herein comprise micron-scale porosity and fibrous struts. The Frozen Films take on a more 3D porous sponge-like character when they are prepared at a greater thickness; the thickness of the cast film also influences the pore structure of the films.

The Frozen Films described herein are freeze cast polymeric thin films. The frozen films can be produced from a chitosan solution (e.g., a 0.5 wt % chitosan solution, or a 1 wt % chitosan solution). The frozen films can also be produced from other materials, including alginate, carboxymethyl chitosan, collagen, and gelatin.

To prepare the films, glass coverslips were placed upon a piece of aluminum foil. A small amount (10-100 µL) of the polymer solution was applied to glass coverslips, then spread across the coverslip (e.g., with a foam brush). The coated coverslips on the aluminum foil were transferred to a −20° C. freezer and frozen for 1 hour. After freezing, the frozen films were loaded into a freeze drier to remove the ice crystals. The films were freeze dried for several hours. The dried films were removed from the freeze drier, then neutralized or crosslinked to stabilize the polymer structure. The frozen films demonstrate a highly porous structure with pore size increasing with increasing film thickness. The pore structure across the coverslip is fairly homogeneous, however, there can be regions of heterogeneity. Breast cancer cells (MDA-MB-231) cultured on the frozen films with different thicknesses demonstrated different responses, with the cells being on the surface of the thinnest frozen films whereas the cells migrated into the porous structure of the thicker frozen films. This technique is can also work for ceramic suspensions.

Possible uses of the frozen films include, but are not limited to use as a cell culture substrate, use as a biomaterial scaffold, and use in energy or other applications. The frozen films described herein can provide easier cell seeding, cell recovery, and imaging than 3D scaffolds.

As a biomaterial substrate, the frozen films provide a pore structure similar to 3D porous scaffolds (porous sponges) except they are in a much thinner structure (<200 microns vs 1-2 mm). The thinner structure makes cell culture with these films simpler than the 3D porous scaffolds and enables better cell recovery for downstream analysis of the cells (i.e., with PCR, sequencing, flow cytometry, etc.). The thinner structure also keeps the cells in a similar focal plane for imaging of the samples, compared to the 3D porous scaffolds. The frozen films are also superior to air-dried polymer films as they provide a more 3D-like structure, which provides additional cues to guide cell interaction with the materials. The frozen films can be compatible with high throughput screening systems used by pharmaceutical companies and biotech companies during pre-clinical drug development applications. For example, the Frozen Films can be used as a cell culture substrate in 96-well cell cultures for pre-clinical drug screening or screening of other therapies. The Frozen Films can also be used as a biomaterial scaffold that can be implanted in vivo. The frozen films are a platform that can solve existing issues, such as creating more physiologically relevant cell cultures without creating additional complications with other biomaterials that could provide 3D cultures (i.e. hydrogels, 3D porous sponges, nanofibers, etc.).

Example 2

Described herein is the development of a biomaterial cell culture platform that spans dimensionality between 2D films and 3D scaffolds that can enable a 2.5D (or 3D-like) environment for cells. This is believed to be the first demonstration of freeze cast films, particularly for use as a cell culture platform. Since the frozen films have much lower volume than a 3D scaffold, they combine the benefits of the scaffolds and 2D films, while limiting the drawbacks of the scaffolds (complications with downstream processing, diffusional limitations, etc.). Such a culture platform can provide a highly customizable substrate that is easy to work with, enabling translation into the pre-clinical drug screening pipeline.

Biomaterials are used to prepare different substrates for cell culture and can direct cell response through material chemistry and mechanics. Biomaterials are commonly prepared as 2D films through coating or drying procedures and 3D scaffolds through freeze casting, gelation, or other techniques. While these methods are commonly used, there is interest in producing 2.5D substrates to help decouple aspects of cell-material interaction and for culture applications.

Freeze casting is a commonly used method for fabricating 3D porous biomaterial scaffolds. It is flexible to aqueous materials and enables control of pore size and stiffness through altering the freezing temperature and solution concentration. While freeze casting has been well studied in biomaterials research and other areas, the production of freeze casted films is an area that has not been explored.

The propagation of the freezing front in freeze casting is the primary method for pore formation. Pore formation arises as polymers and other materials are not soluble in ice, so they are excluded from the ice crystals as they form and consolidated into a porous network. The nucleation and growth of ice crystals depends on solution parameters and the degree of undercooling in the system.

Figure 13:
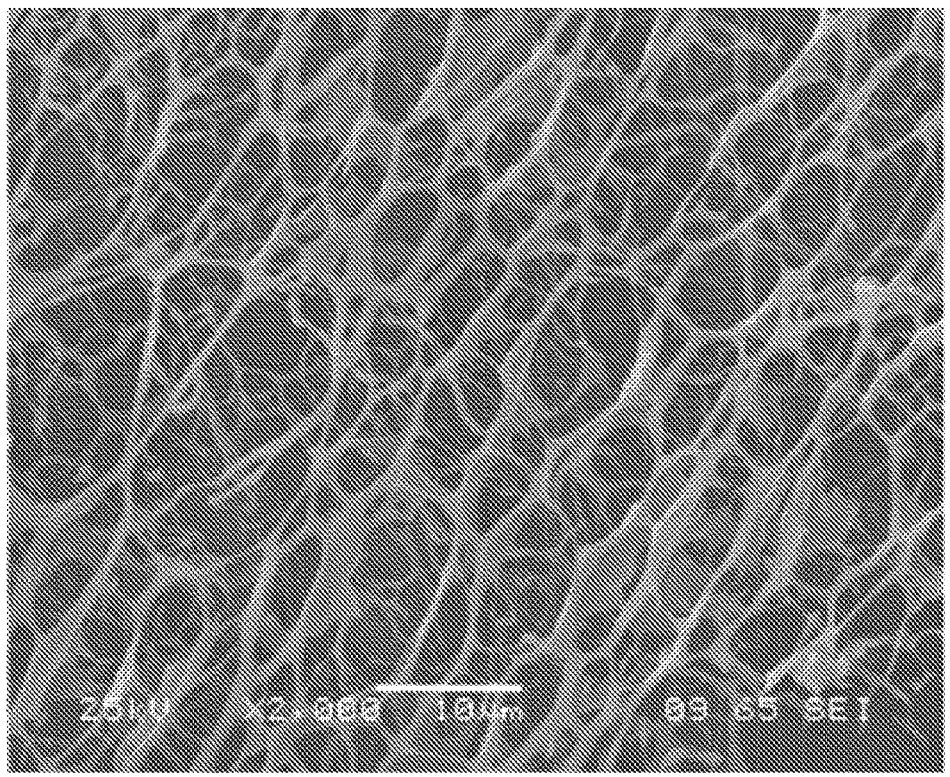
FIG. 13 is a high magnification SEM image of frozen film morphology from 1 wt % chitosan with low volume. The structure is suspended above the coverslip and comprises nanoscale fiber-like features.

A chitosan solution (1 wt %) was cast on glass coverslips in a variety of manners, including dip coating, spin coating, and brushing. The samples were frozen at −20° C. or −80° C. and evaluated for uniform, homogeneous coverage of the substrate. Adjusting the volume of the deposited solution influenced the homogeneity of the coating and the freezing pattern. After several tests, a robust method applying the solution to coverslips with a foam brush was developed. This method produced porous films at low volumes which transition to scaffold-like structures at higher volumes (FIG. 1-FIG. 6). Further evaluation of these samples with SEM imaging demonstrated that the samples at low volumes have a porous network suspended above the coverslip, as opposed to a film with raised features (FIG. 7-FIG. 12). The SEM imaging also demonstrated that the pore structure and dimensions change for intermediate volumes and further increases with increasing volume (FIG. 7-FIG. 12). The interaction of the porous network with the coverslip is shown in FIG. 13, which indicates that the porous structure is composed of nanoscale fibers and is elevated above the coverslip.

These frozen films can provide a cell culture platform that combines the benefits of 2D and 3D substrates. The frozen films could also be utilized in other application areas, depending on the input materials.

Example 3

Cancer therapies are evaluated with pre-clinical trials before they are approved for use in patients. Most of these trials are conducted on 2D plastic surfaces, which do not resemble the in vivo conditions. 3D biomaterial scaffolds better replicate in vivo conditions, but have other limitations for downstream cell analysis. To address the limitations with these culture platforms, the frozen films (FF) described herein were developed to combine the benefits of each platform while reducing their limitations. The frozen films provide a microscale features at low volumes and a porous network at larger volumes.

Varying the volume of the chitosan solution used in the production of the frozen films can affect their thickness. The frozen films have a different structure compared to 3D scaffolds and 2D films, affecting the cell culture behavior. Cell morphology and proliferation will vary in response to the different substrates' morphology and thicknesses.

Materials and Methods

Production. Frozen Films, 2D films, and 3D Scaffolds were all produced from a 1 w % Chitosan solution. The 1 w % Chitosan solution was prepared in a solution of deionized water and 0.5 w % acetic acid. The frozen films and 2D films were developed at 3 different volumes of Chitosan solutions (20 μL, 50 μL, and 100 μL) to produce films of different thicknesses. The frozen films were cast onto 12 mm diameter coverslips, while the 2D films were cast in 24-well plates. 3D scaffolds were developed by casting the 1 w % Chitosan solution into 24-well plates for shape. The 2D film groups were left to air dry, while the frozen films and 3D groups were frozen and then freeze dried. The freeze casting process for the 3D scaffolds involved casting the 1 w % Chitosan solution at room temperature, moving the molds into a −20° C. freezer overnight, and then freeze-drying the frozen scaffolds at −80° C. for 48 hrs. Samples were neutralized with an NaOH solution and sterilized in ethanol before being used for cell culture. The sterilization procedure included soaking the scaffold in a 70% ethanol solution under vacuum for 45 minutes and then washing with sterile DPBS.

Imaging. The groups were imaged using brightfield imaging at 4× and 10× magnifications. Images of the groups with cell culture were also taken with GFP on 3 occasions at 4× and 10× magnification. SEM imaging was done to highlight differences in substrate morphology.

Cell Culture: MDA-MB 231 breast cancer cells were used for cell culture due to properties such as immunofluorescence for GFP imaging. 44,000 cells were seeded on each sample at day 0, imaged on day 1, and imaging and AlamarBlue were run on day 3 and day 7.

AlamarBlue Assay: Standard AlamarBlue protocol was followed to determine cell proliferation during cell culture. For analysis, a 10% AB reagent solution was added to the samples and incubated for 2 hours. The solutions were then extracted and analyzed at a wavelength of 560 excitation and 590 emission.

Results

Figure 14:
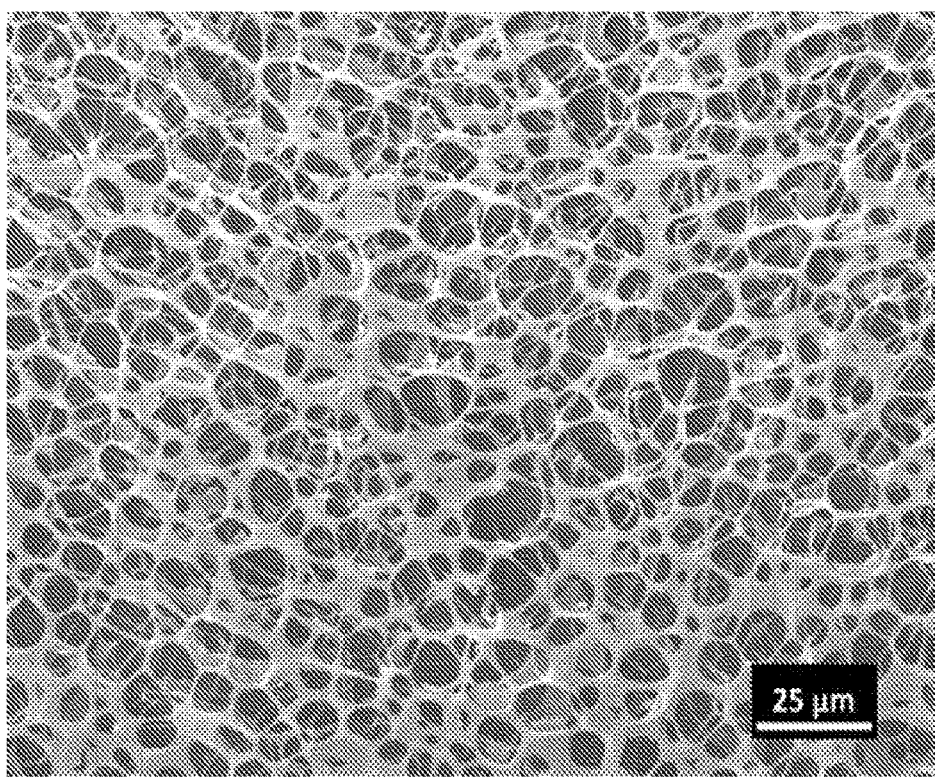
FIG. 14 is a SEM image of frozen film morphology from 20 μL of a 1 wt % chitosan solution deposited and frozen at −20° C.
Figure 15:
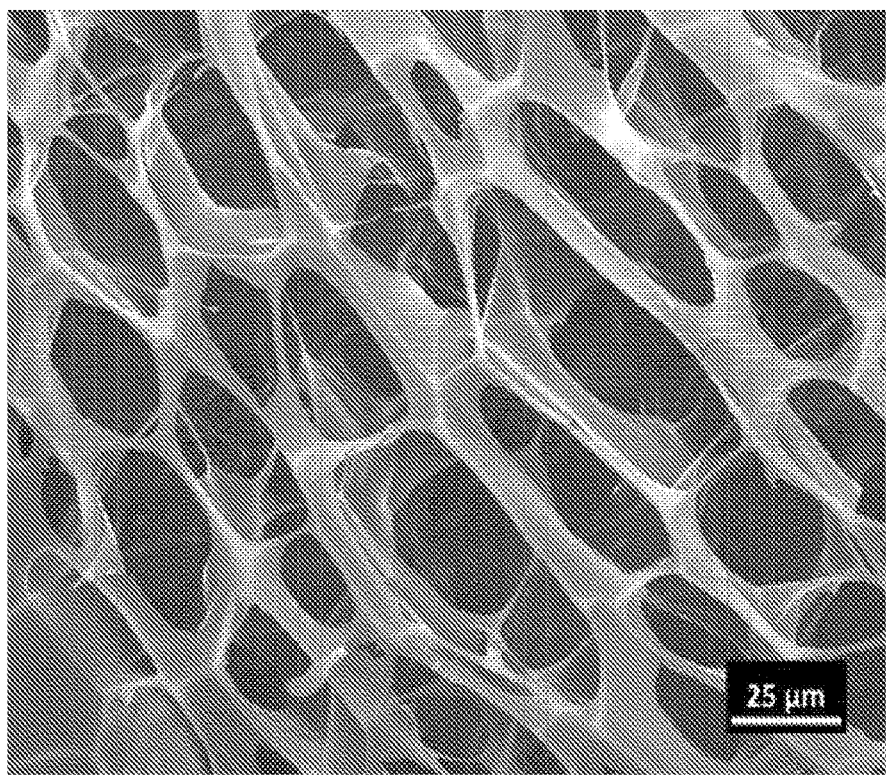
FIG. 15 is a SEM image of frozen film morphology from 50 μL of a 1 wt % chitosan solution deposited and frozen at −20° C.
Figure 16:
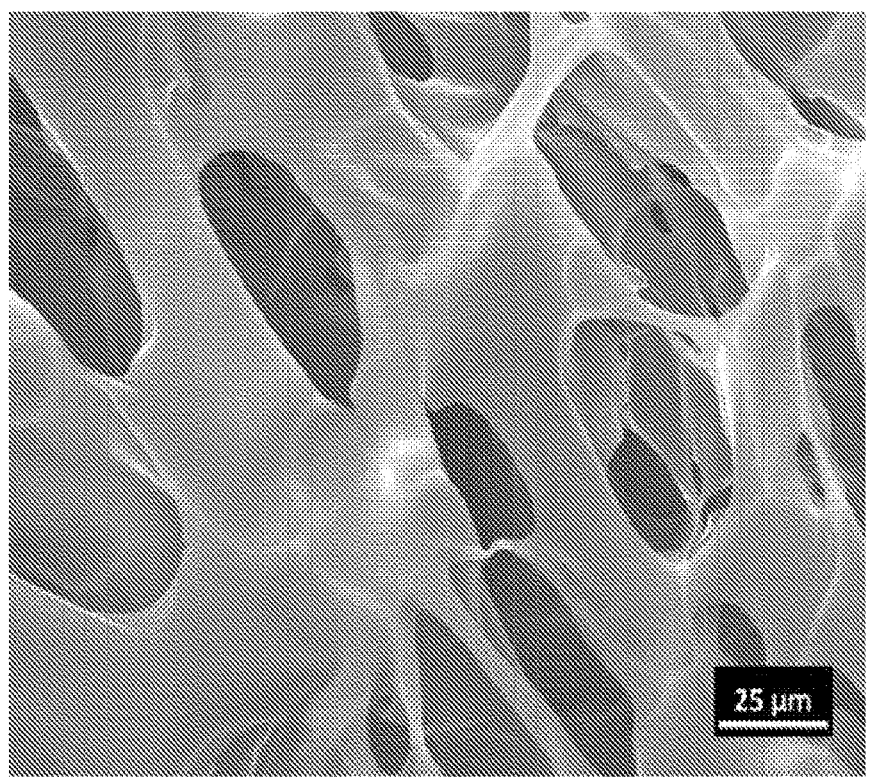
FIG. 16 is a SEM image of frozen film morphology from 100 μL of a 1 wt % chitosan solution deposited and frozen at −20° C.
Figure 17:
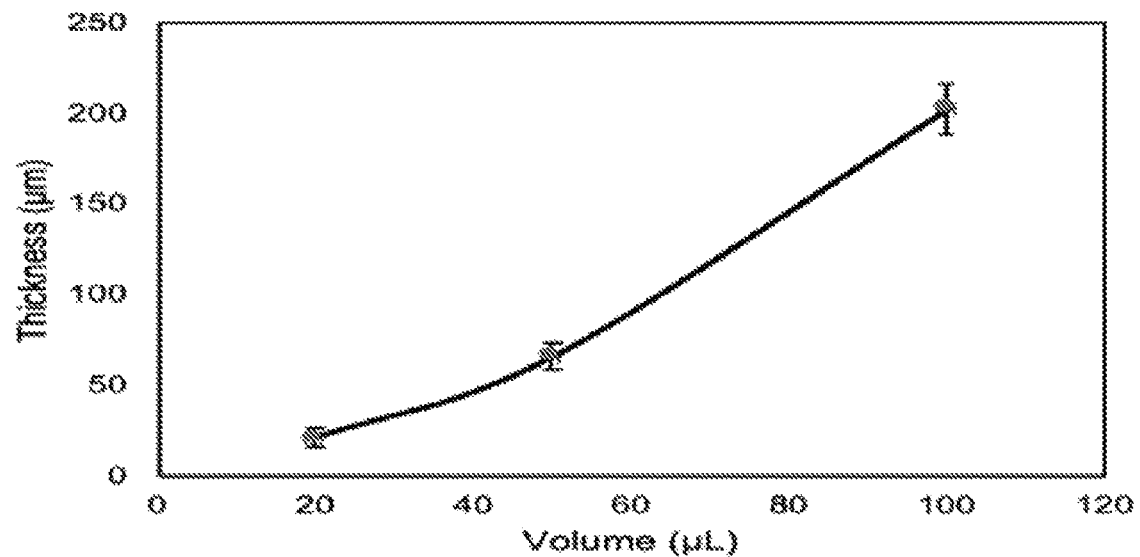
FIG. 17 is a plot of the frozen film thickness as a function of the deposited volume.

The overall pore size varied across the three frozen films based on the volume of the 1 w % Chitosan solution used (FIG. 14-FIG. 16); the 20 μL frozen film had the smallest pore structure while the 100 μL frozen film had the largest pore size. The SEM images confirm that the frozen films have a more enhanced structure than a 2D surface and that the volume of solution used in the production of the film affects pore size. FIG. 17 demonstrates that the thickness of the films increases with the volume of the 1 w % Chitosan solution used. Frozen film thickness increased from approximately 20 μm thick for 20 μL of the 1 w % chitosan solution used to over 200 μm thick for 100 μL of the 1 w % chitosan solution. The variation in pore size and film thickness demonstrates the effect of processing on the film structure.

Figure 18:
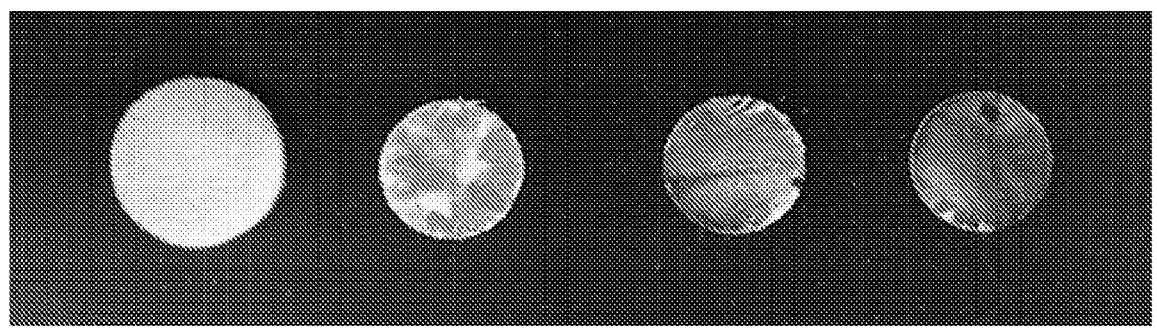
FIG. 18 shows photographs of substrate groups. From left to right: 3D scaffolds, 100 μL frozen film, 50 μL frozen film, and 20 μL frozen film.

Photos of substrate groups are shown in FIG. 18.

Figure 19:
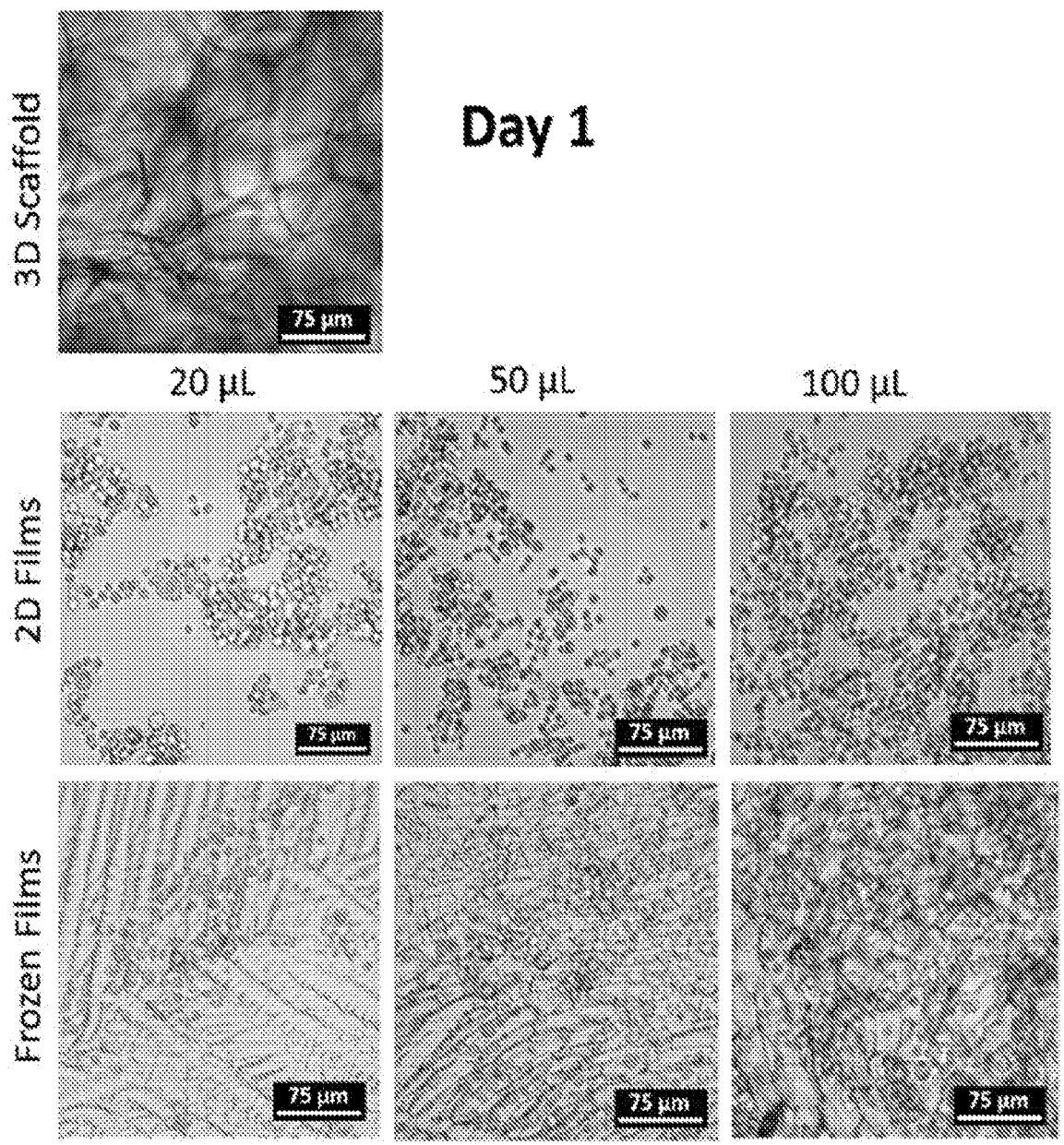
FIG. 19 shows brightfield images of MDA-MB-231 cell morphology on different substrates at day 1 taken at 10× magnification.
Figure 20:
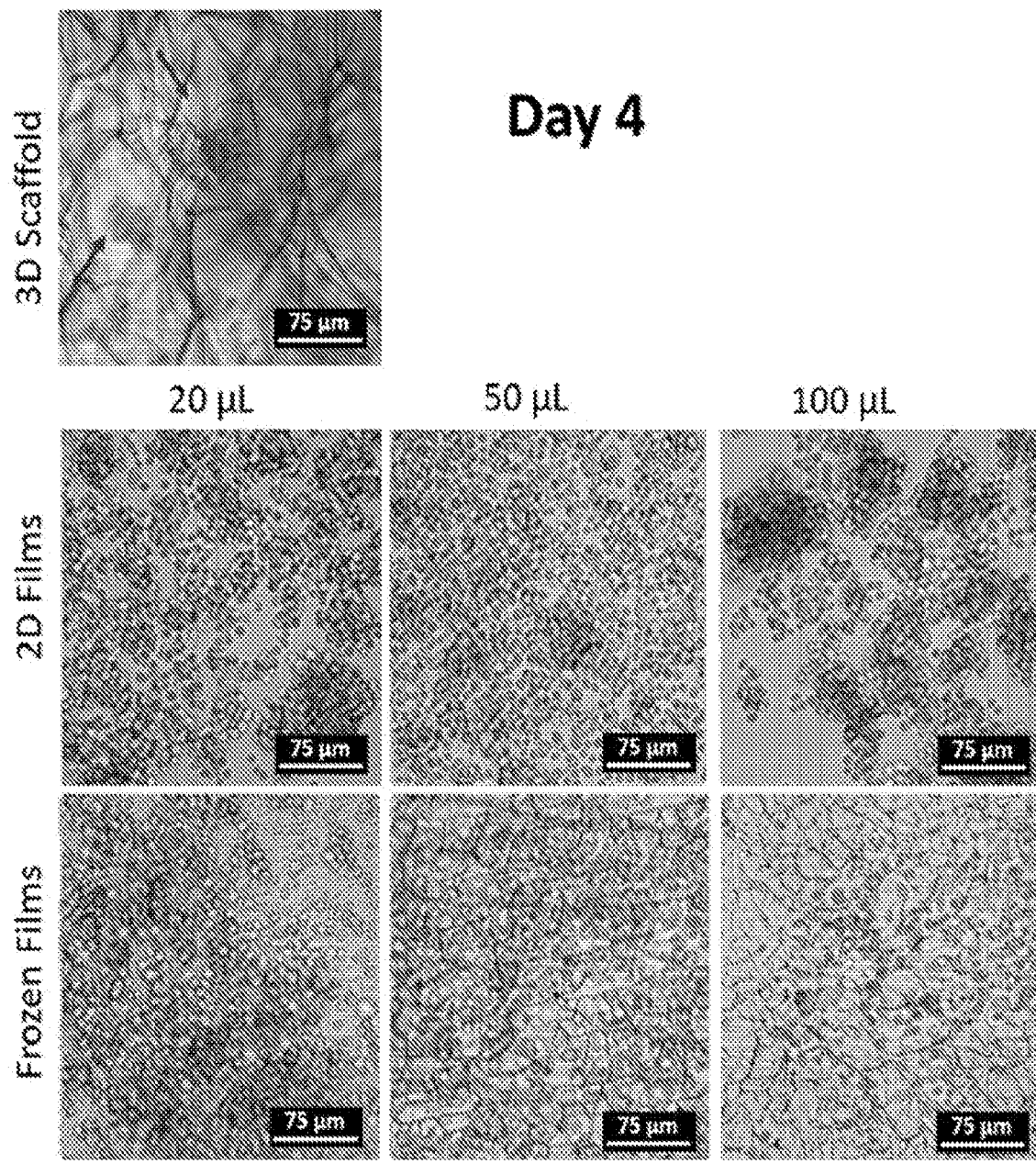
FIG. 20 shows brightfield images of MDA-MB-231 cell morphology on different substrates at day 4 taken at 10× magnification.
Figure 21:
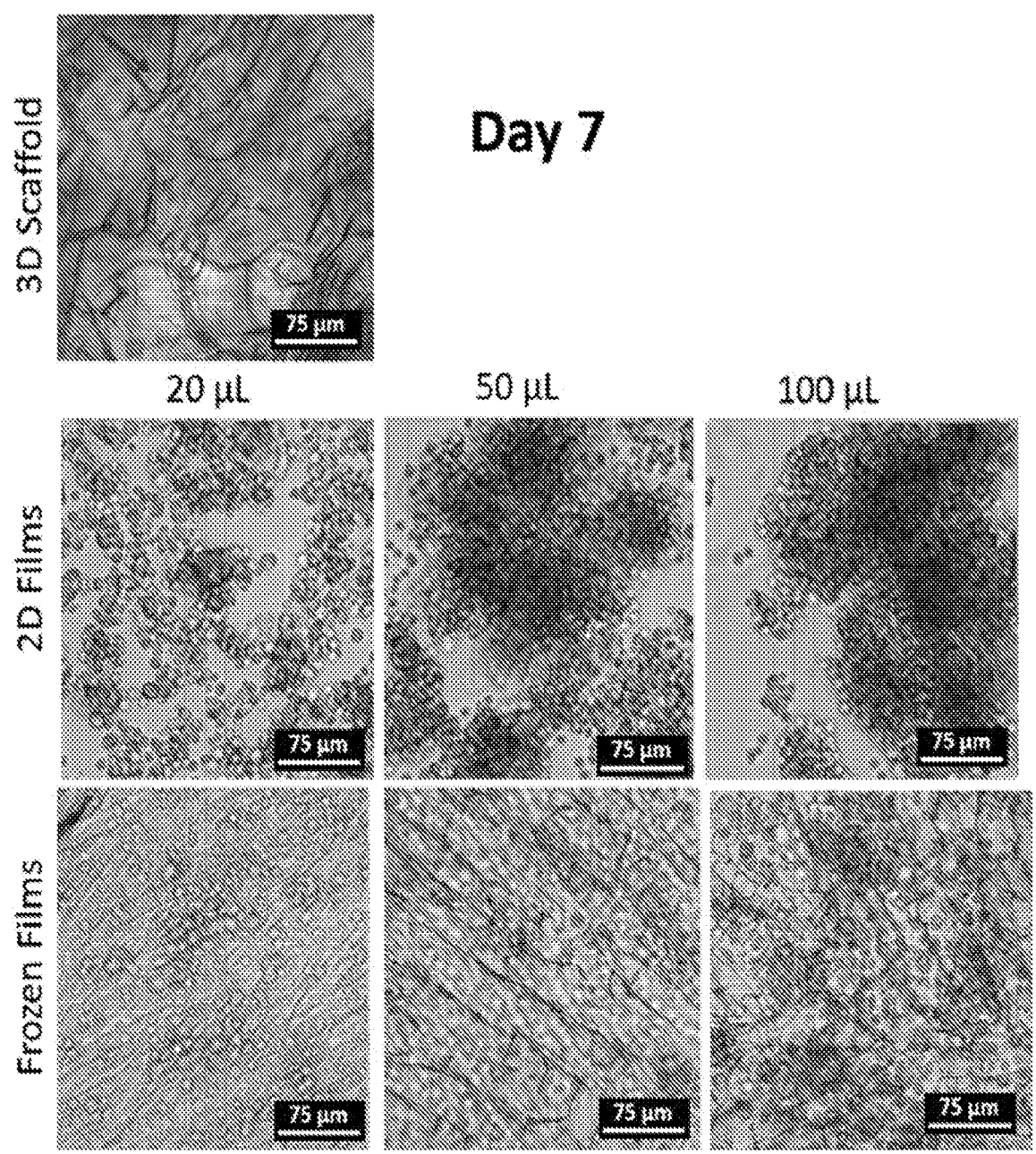
FIG. 21 shows brightfield images of MDA-MB-231 cell morphology on different substrates at day 7 taken at 10× magnification.
Figure 22:
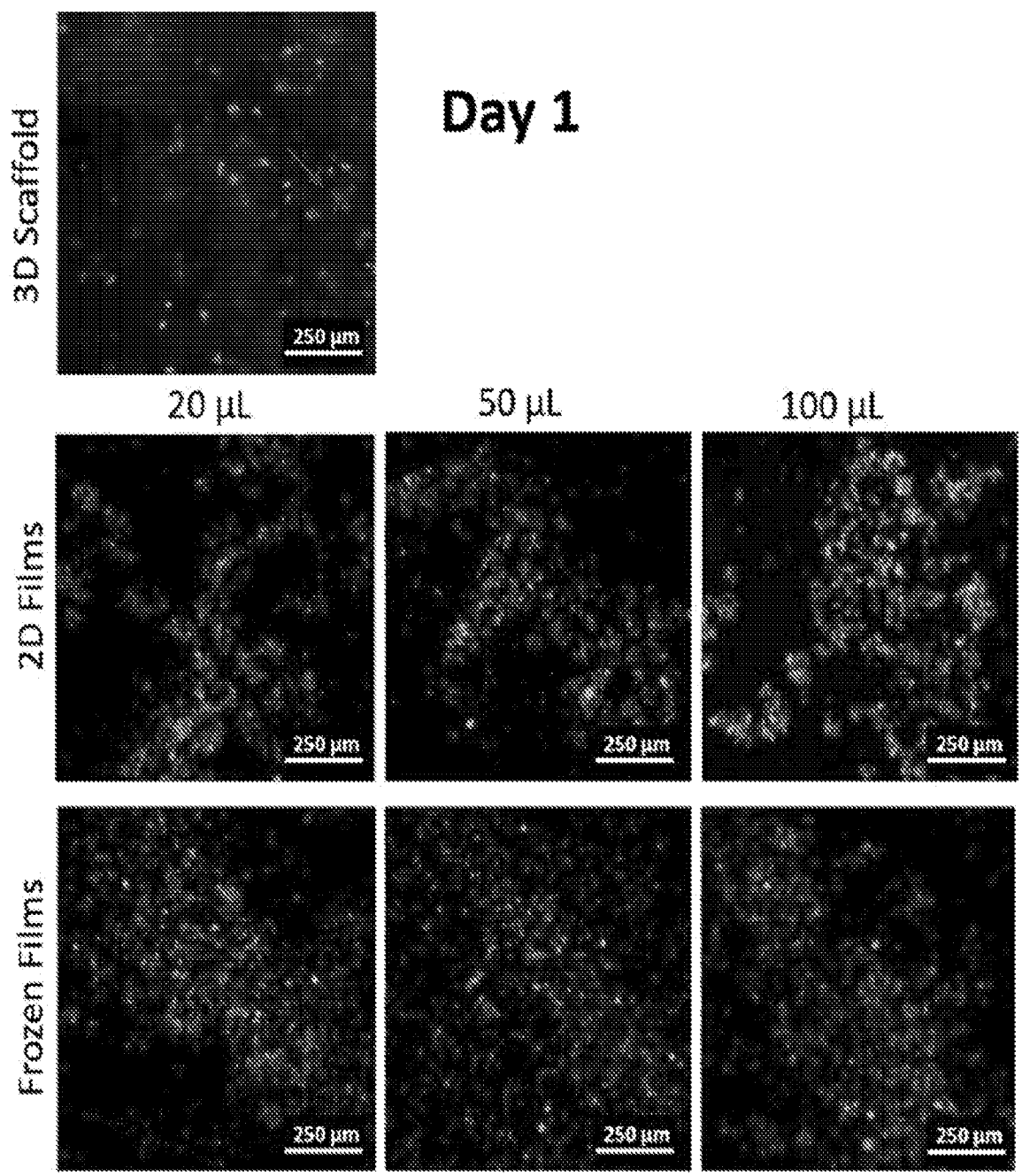
FIG. 22 shows green fluorescence images of MDA-MB-231 cell morphology on different substrates at day 1 taken at 4× magnification.
Figure 23:
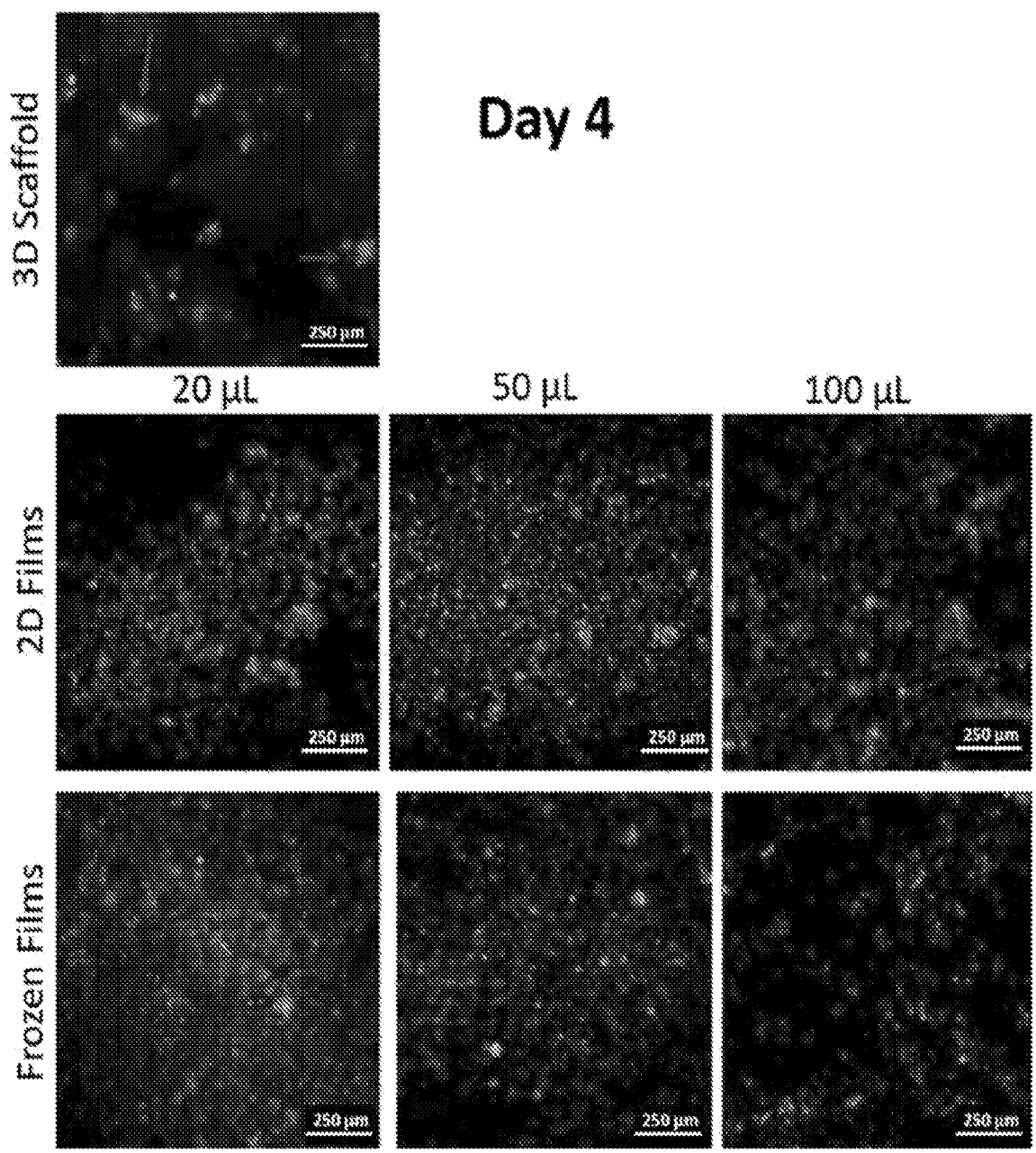
FIG. 23 shows green fluorescence images of MDA-MB-231 cell morphology on different substrates at day 4 taken at 4× magnification.
Figure 24:
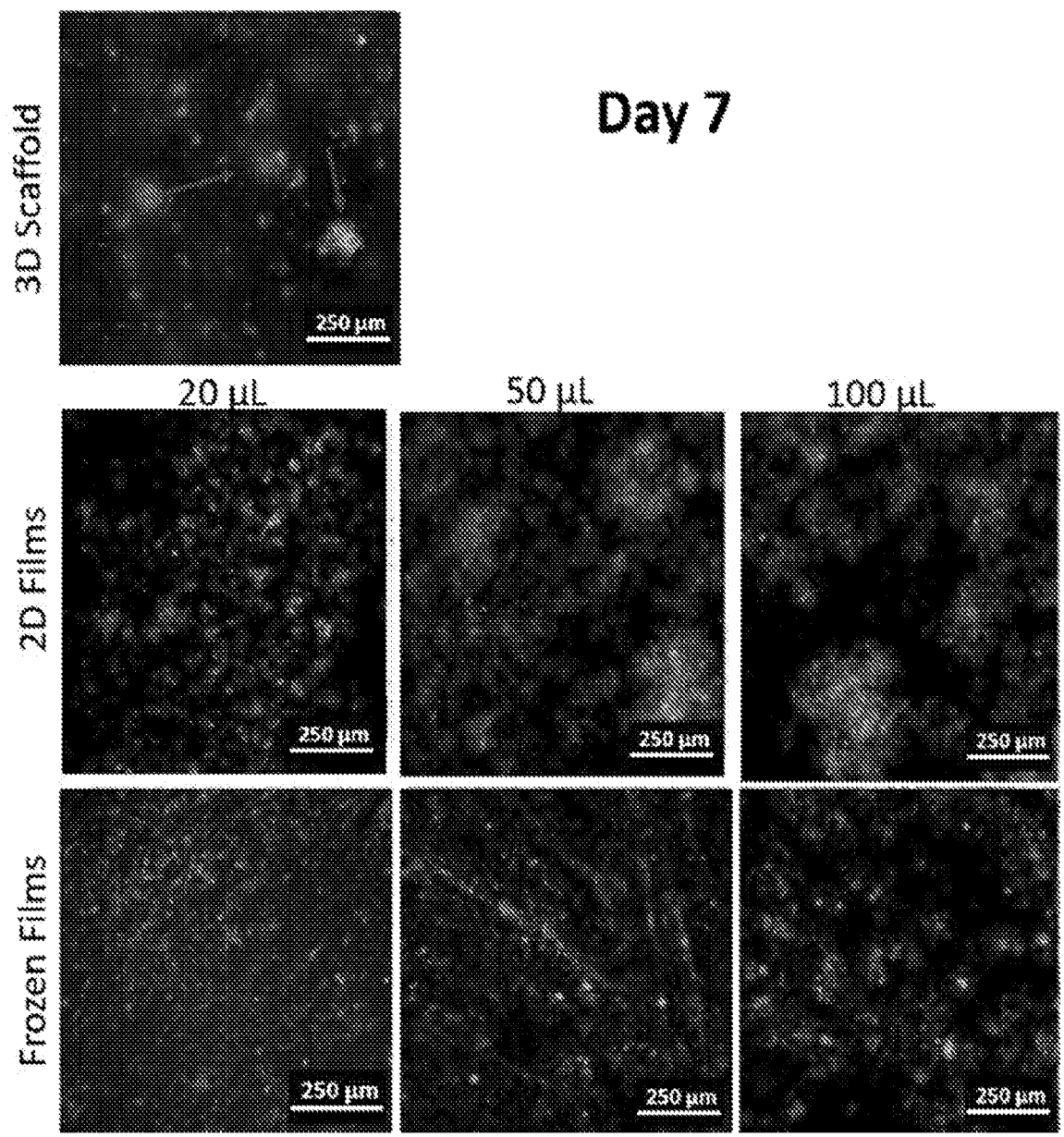
FIG. 24 shows green fluorescence images of MDA-MB-231 cell morphology on different substrates at day 7 taken at 4× magnification.
Figure 25:
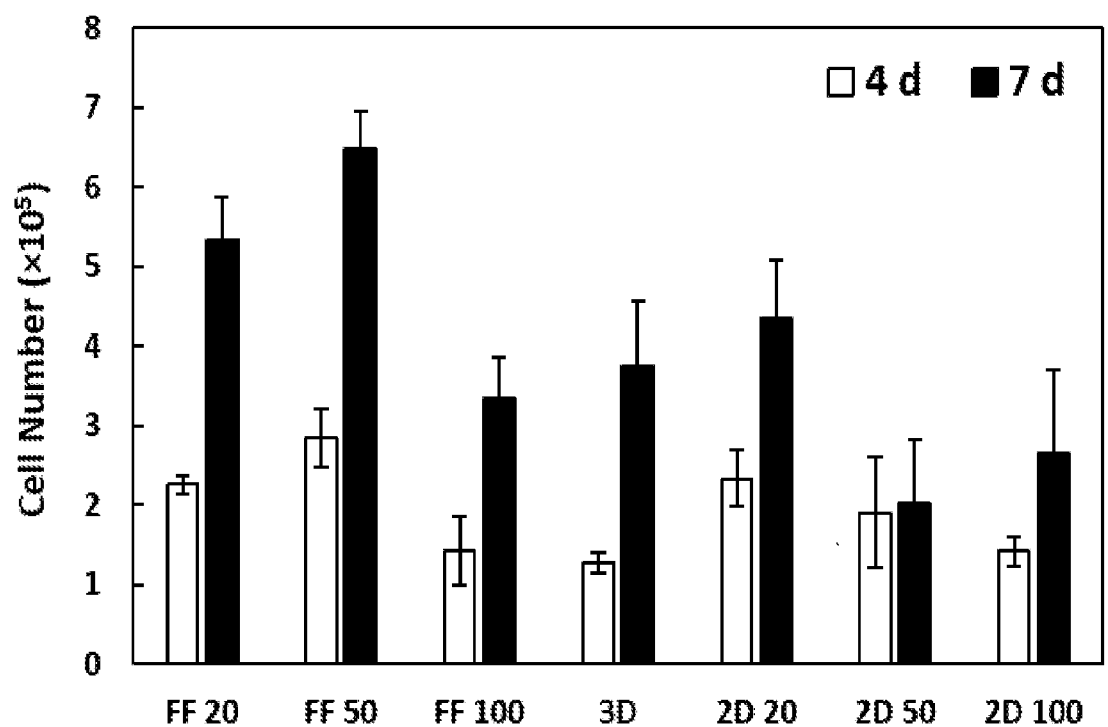
FIG. 25 shows the results of an AlamarBlue proliferation assay for MDA-MB-231 proliferation on chitosan groups over 7 days.

The brightfield images (FIG. 19-FIG. 21) and GFP images (FIG. 22-FIG. 24) show cell morphology over the 7-day cell culture period on the chitosan-based substrates. The cells stayed rounded and adhered to the surface of the frozen films in a similar manner to the clusters formed on the 3D scaffolds. Cells from the 2D group formed clusters, but remained mostly suspended in the media throughout the culture period. The differences in cell shape and behavior point to the frozen films achieving the benefits of 3D scaffolds regarding cell culture. FIG. 25 displays an increasing cell proliferation trend during cell culture. This indicates healthy cell growth on the chitosan groups, with the best results coming from the 20 μL and 50 μL frozen films.

Conclusions

For this project, seven chitosan-based substrates were developed to test the chitosan frozen films as a reasonable alternative to traditional 2D and 3D cell culture platforms. Noticeable differences were seen between the various substrates.

Adjusting the processing conditions of chitosan frozen films lead to the development of different thicknesses of films, with varied mechanical properties and benefits. The frozen films provide a microscale features at low volumes and a porous network at larger volumes. Cell cultures on frozen films had proliferation and morphology comparable to the samples from 3D group. Compared to 3D scaffolds, the frozen films provided the benefits of being faster to manufacture and cell culture on the frozen films being easier to observe. Compared to the 2D films, cells were quicker to attach and showed better structure on the frozen films.

Frozen films of 1 w % Chitosan provided many of the benefits of 3D scaffolds and 2D film microenvironments, while minimizing the negative aspects of each, creating an enhanced 2D environment. The success of these chitosan frozen films provides a foundation for further development and research on the effects of frozen film microenvironment on cancer cell culture (e.g., longer cell culture time, larger sample groups, quantitative RT-PCR, dose-response experiments, and statistical analysis). The development of frozen films with different chemical composition can also be explored.

Example 4

Figure 26:
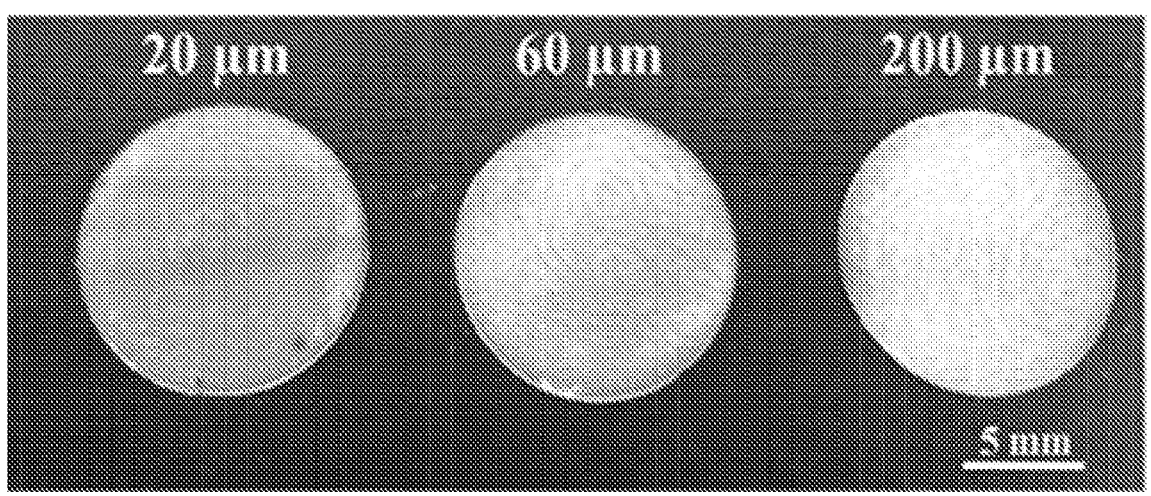
FIG. 26 shows images of frozen films having a thickness of 20 μm (left), ~60 μm (middle), and ~200 μm (right).
Figure 27:
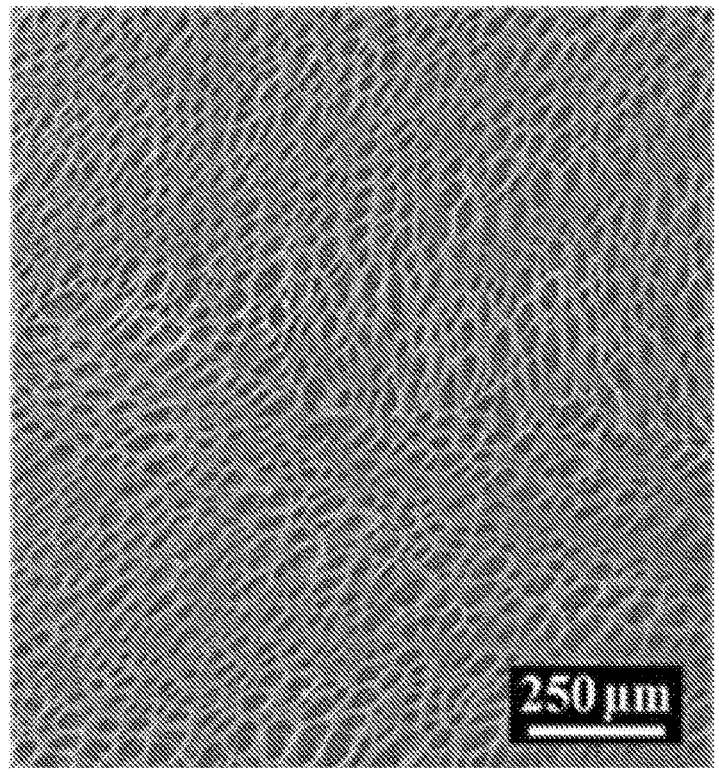
FIG. 27 is a SEM image of frozen film morphology from 204 of a 2 w/v % chitosan-collagen solution deposited and frozen, giving a film with a thickness of ~20 μm.
Figure 28:
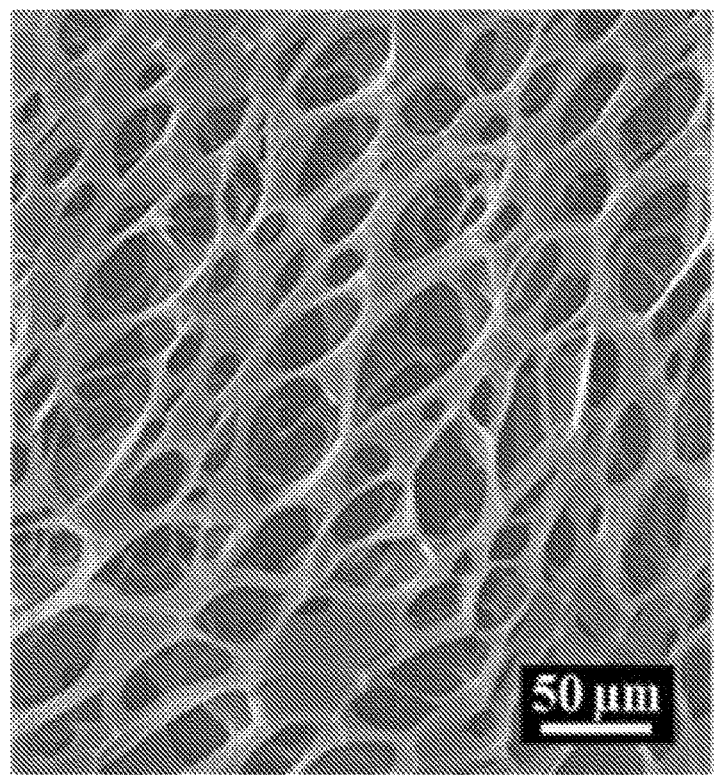
FIG. 28 is a SEM image of frozen film morphology from 204 of a 2 w/v % chitosan-collagen solution deposited and frozen, giving a film with a thickness of ~20 μm.
Figure 29:
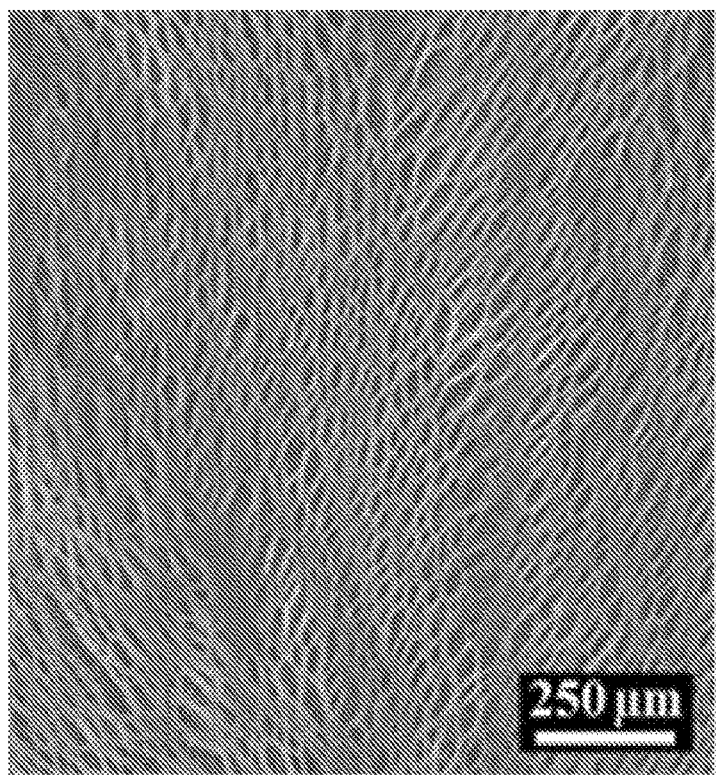
FIG. 29 is a SEM image of frozen film morphology from 504 of a 2 w/v % chitosan-collagen solution deposited and frozen, giving a film with a thickness of ~60 μm.
Figure 30:
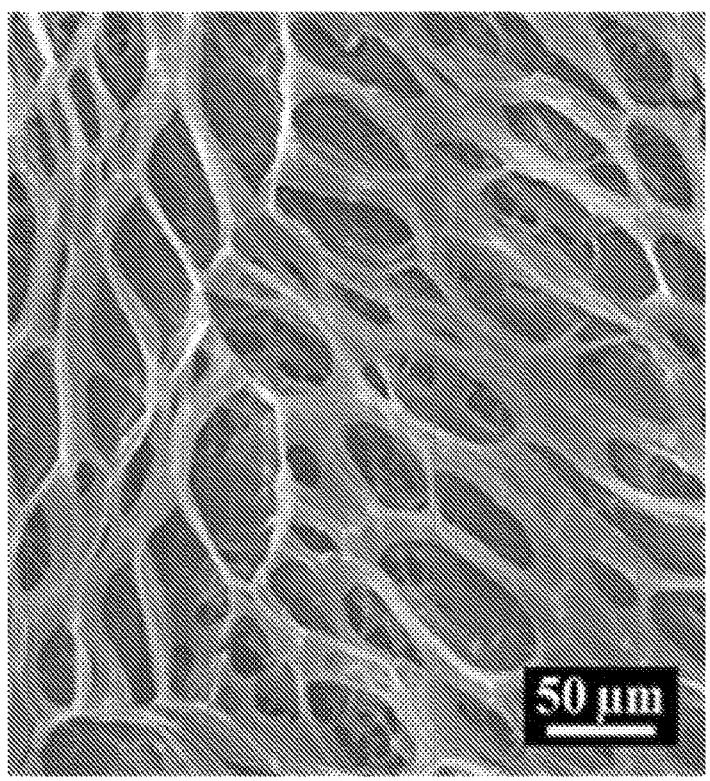
FIG. 30 is a SEM image of frozen film morphology from 504 of a 2 w/v % chitosan-collagen solution deposited and frozen, giving a film with a thickness of ~60 μm.
Figure 31:
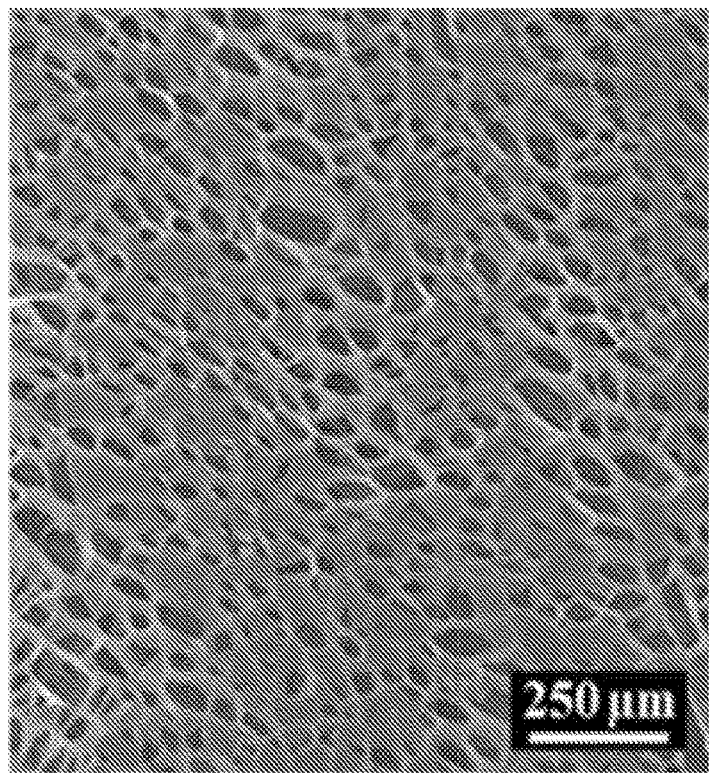
FIG. 31 is a SEM image of frozen film morphology from 1004 of a 2 w/v % chitosan-collagen solution deposited and frozen, giving a film with a thickness of ~200 μm.
Figure 32:
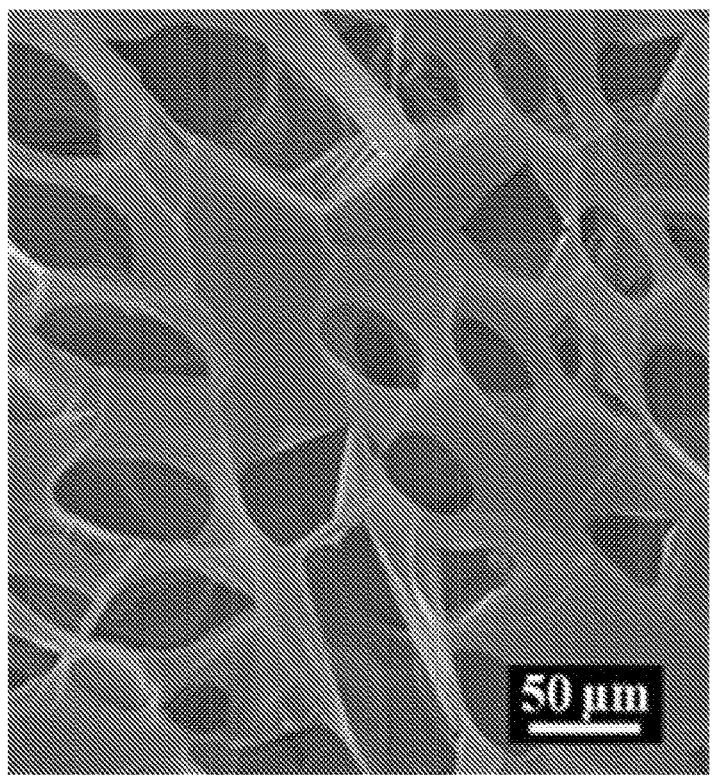
FIG. 32 is a SEM image of frozen film morphology from 1004 of a 2 w/v % chitosan-collagen solution deposited and frozen, giving a film with a thickness of ~200 μm.
Figure 33:
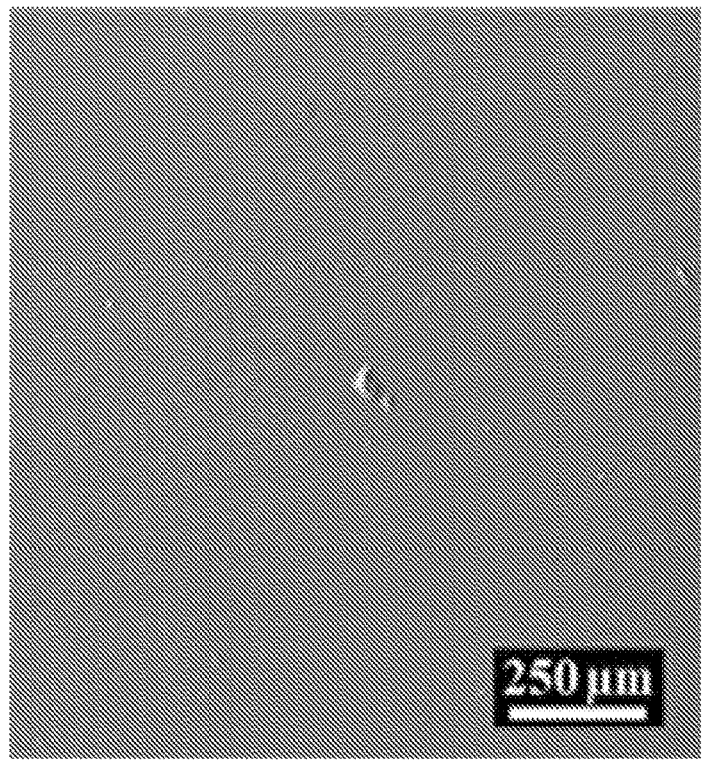
FIG. 33 is a SEM image of frozen film morphology from 2004 of a 2 w/v % chitosan-collagen solution deposited and air dried, giving a film with a thickness of ~8 μm.
Figure 34:
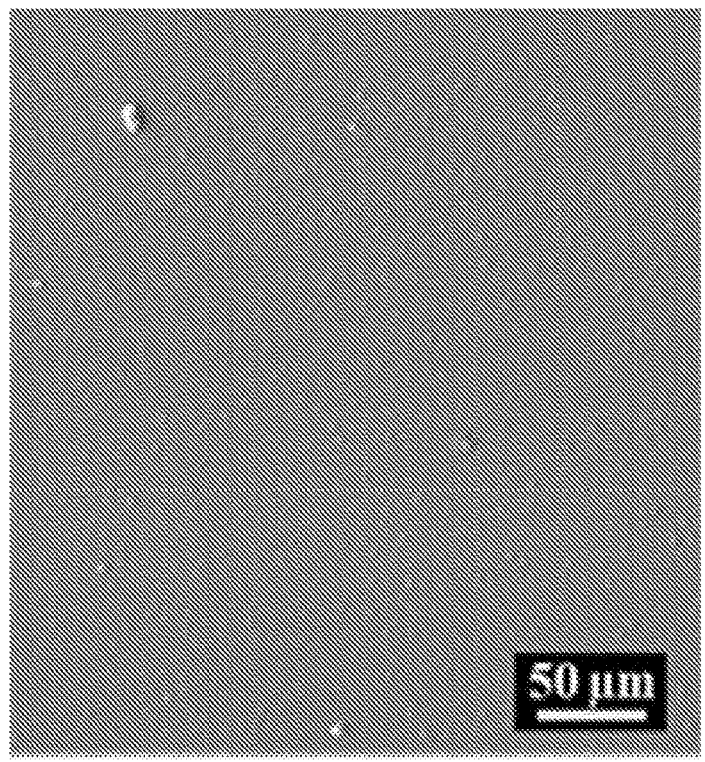
FIG. 34 is a SEM image of frozen film morphology from 2004 of a 2 w/v % chitosan-collagen solution deposited and air dried, giving a film with a thickness of ~8 μm.

Frozen film samples were prepared by depositing different volumes of a 2 w/v % chitosan-collagen solution and subsequently freezing the samples. Images of the frozen films having a thickness of 20 μm (left), 60 μm (middle), and 200 μm (right) are shown in FIG. 26. The thickness of the various films are summarized below in Table 1. SEM images of the various films are shown in FIG. 27-FIG. 34.

TABLE 1

Thickness of various films.

| | Thickness (μm) |
|---|---|
| 20 μL frozen film | 21.65 ± 5.065 |
| 50 μL frozen film | 66.38 ± 7.63 |
| 100 μL frozen film | 203.13 ± 14.31 |
| Scaffold | 2000 |
| 200 μL air dry film | 7.80 ± 1.59 |

Frozen films of varying thicknesses (20 μm, 60 μm, and 200 μm) were prepared with lateral dimensions comparable to that of a well within a 96 well plate.

Frozen films were also prepared using a 2 w % chitosan-1 w % acetic acid (AA) composition.

Figure 35:
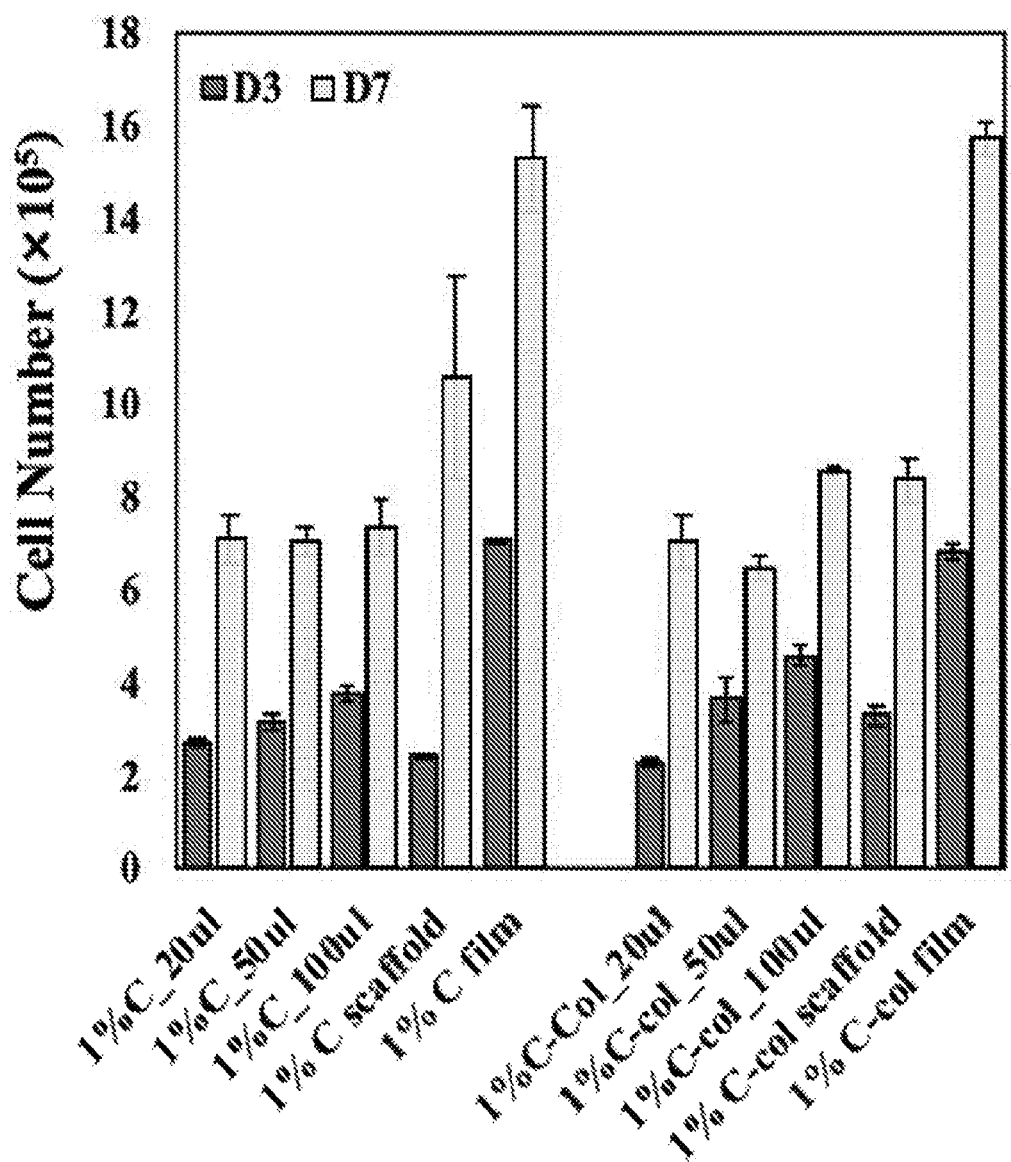
FIG. 35 cell number results for C4-2B cells on 1 w/v % C-1% AA and 2% C-1% AA-Col frozen films, scaffolds and air-dried films.
Figure 36:
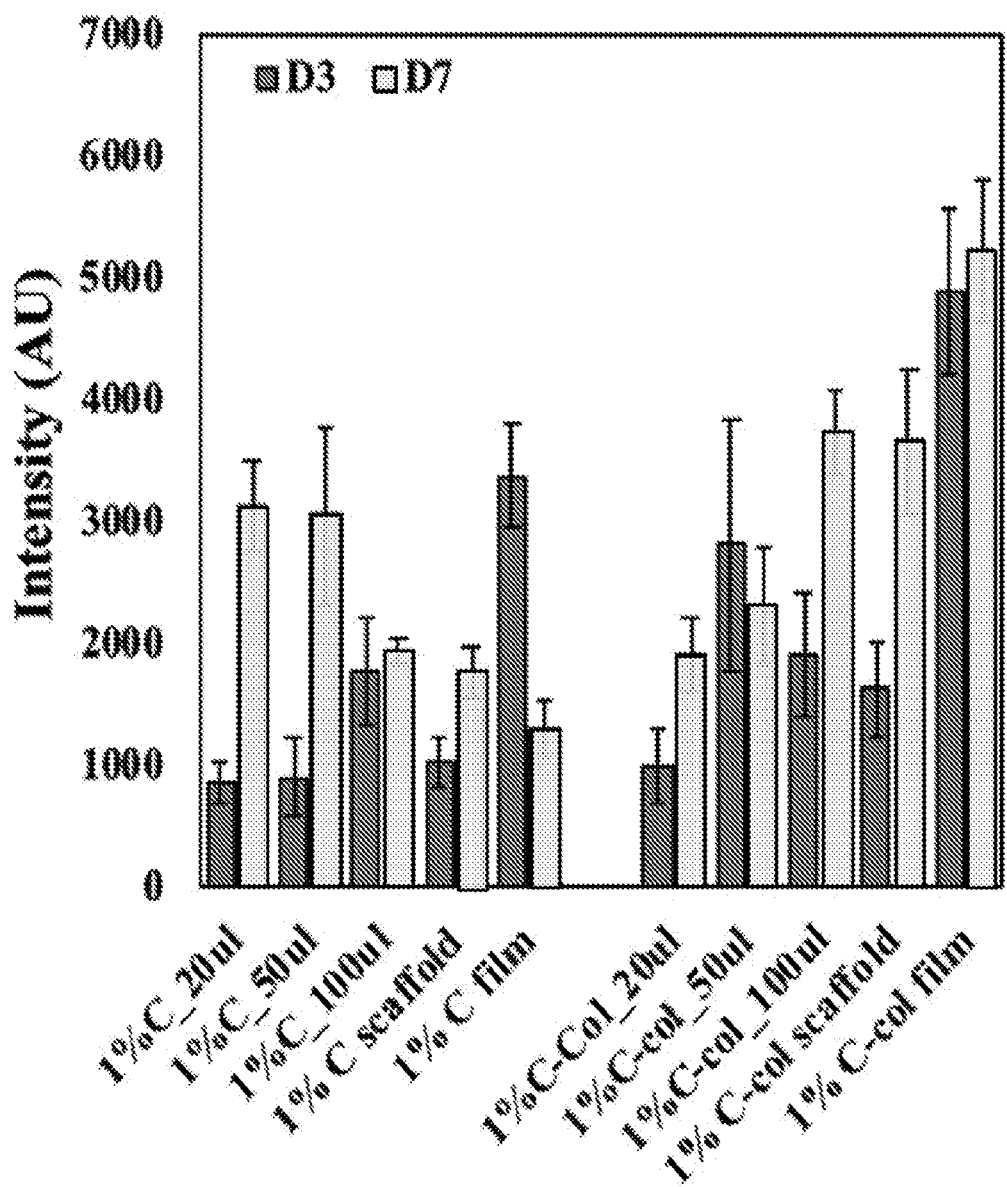
FIG. 36 cell number results for MSC cells on 1 w/v % C-1% AA and 2% C-1% AA-Col frozen films, scaffolds and air-dried films.
Figure 37:
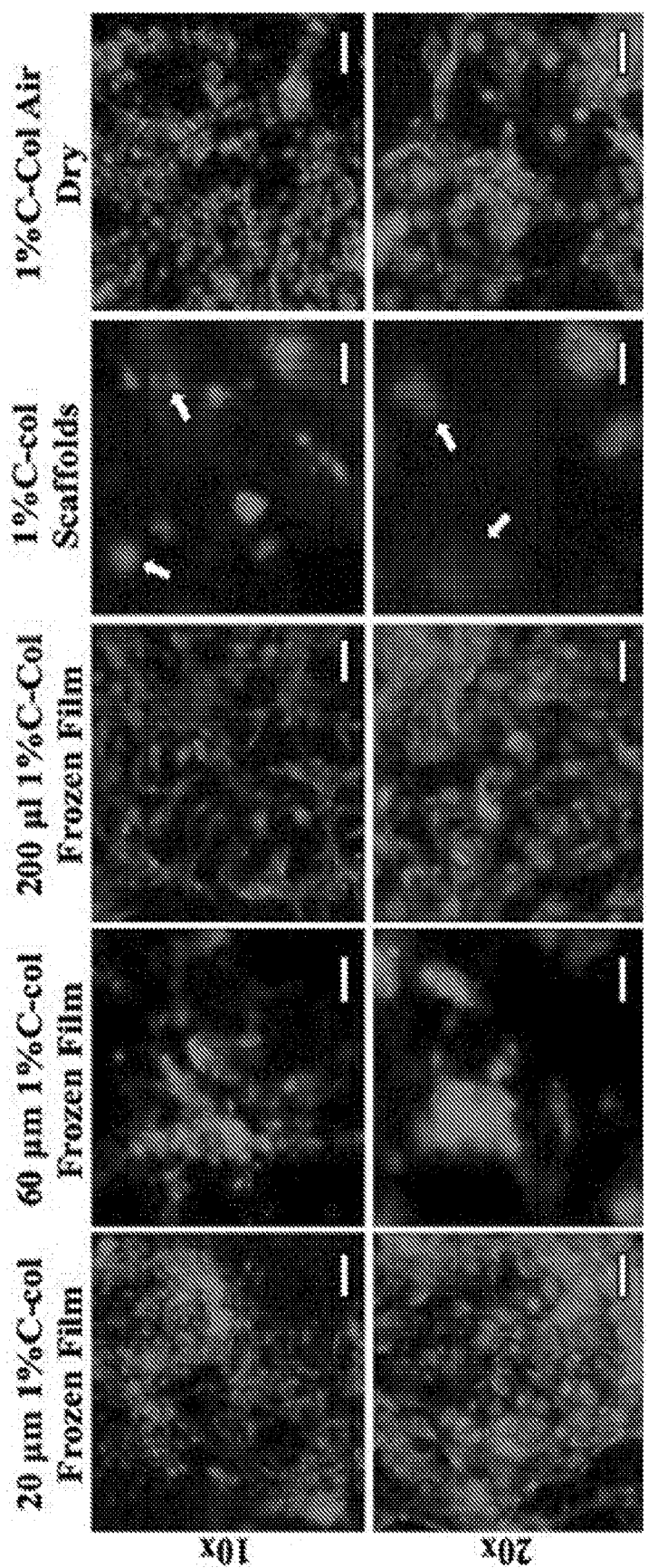
FIG. 37 shows the cell morphology for C4-2B cultured on 2% C-1% AA-Col (1% C-col) frozen films, scaffolds and air-dried films at 10 days.
Figure 38:
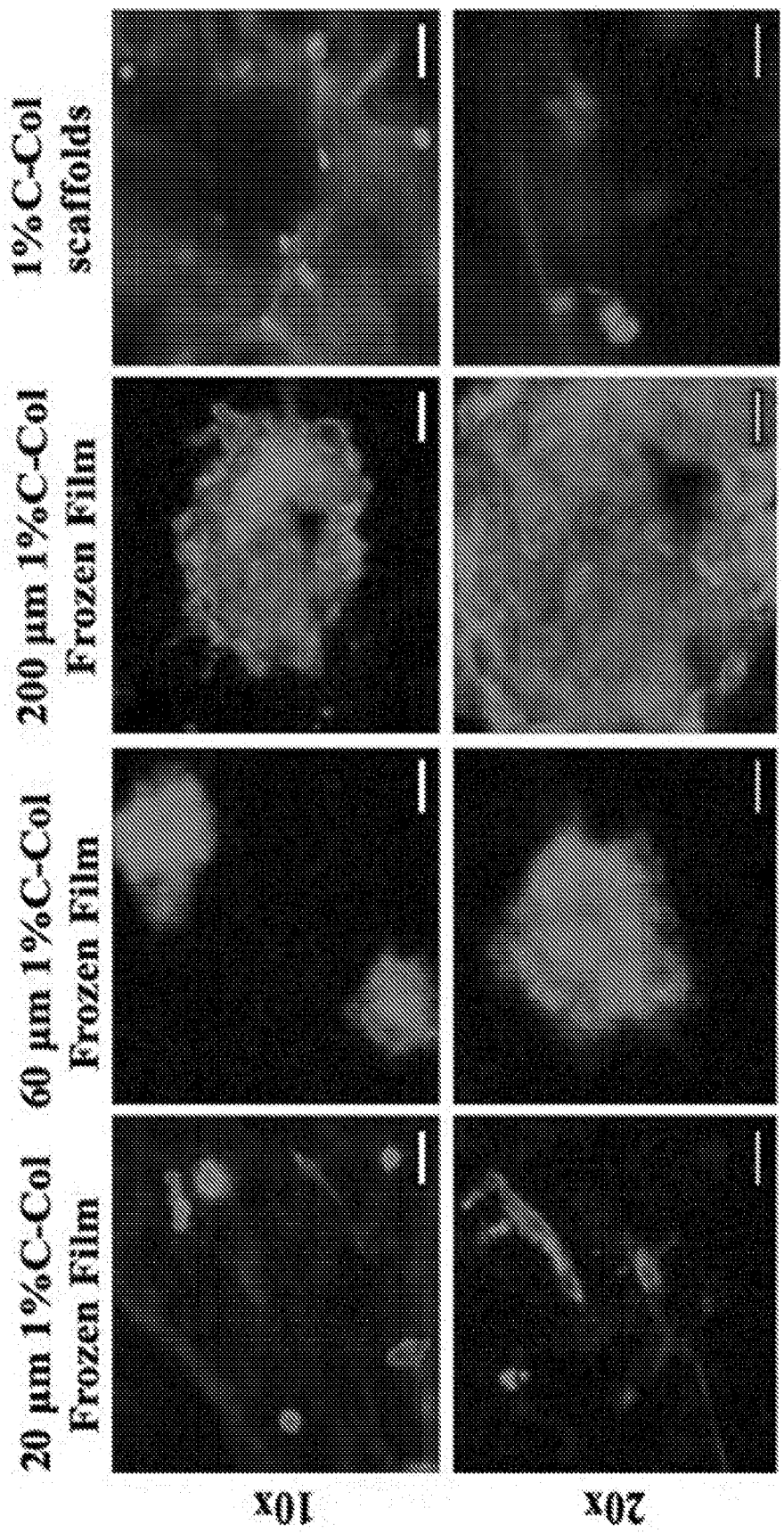
FIG. 38 shows the cell morphology for MSCs cultured 2% C-1% AA-Col (1% C-col) frozen films and scaffolds at 10 days.

C4-2B prostate cancer cells and mesenchymal stem cells (MSCs) were cultured on various films and their interaction with the films was analyzed. The results for C4-2B cells cultured on 1 w/v % Chitosan-1% acetic acid and 2% Chitosan-1% acetic acid-Collagen frozen films, scaffolds, and air dried films are shown in FIG. 35. The results for MSC cells cultured on 1 w/v % Chitosan-1% acetic acid and 2% Chitosan-1% acetic acid-Collagen frozen films, scaffolds, and air dried films are shown in FIG. 36. FIG. 37 shows the cell morphology for C4-2B cultured on 2% Chitosan-1% acetic acid-Collagen (1% C-col) frozen films, scaffolds, and air-dried films at 10 days. FIG. 38 shows the cell morphology for MSCs cultured 2% Chitosan-1% acetic acid-Collagen (1% C-col) frozen films and scaffolds at 10 days.

Figure 39:
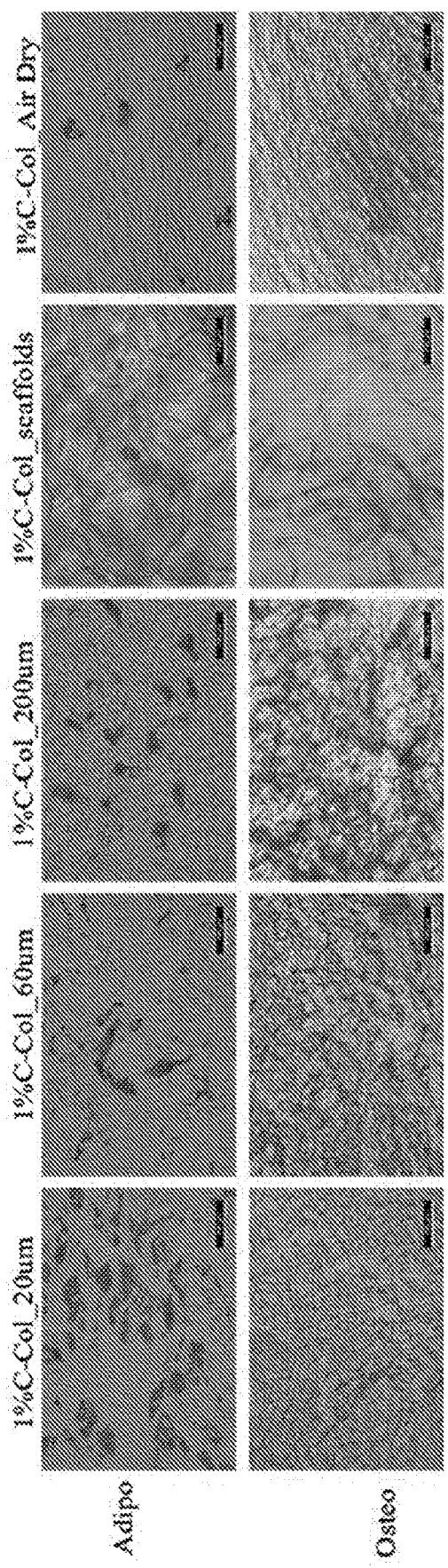
FIG. 39 shows the results of lineage specific staining for MSCs cultured in adipogenic and osteogenic differentiation media for 28 days on 2% C-1% AA-Col frozen films, scaffolds and air-dried films. Scale bars are 100 microns.

MSCs were cultured in adipogenic and osteogenic differentiation media for 28 days and the lineage specific staining was analyzed (FIG. 39). The Frozen Films supported adipogenic differentiation and osteogenic differentiation.

The compositions and methods of the appended claims are not limited in scope by the specific compositions and methods described herein, which are intended as illustrations of a few aspects of the claims and any compositions and methods that are functionally equivalent are within the scope of this disclosure. Various modifications of the compositions and methods in addition to those shown and described herein are intended to fall within the scope of the appended claims. Further, while only certain representative compositions and methods and aspects of these compositions and methods are specifically described, other compositions and methods and combinations of various features of the compositions and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A cell culture substrate or platform comprising a frozen, porous thin film comprising:
    a continuous phase permeated by a plurality of pores;
    wherein the continuous phase comprises a polymer, a ceramic material, or a combination thereof;
    wherein the plurality of pores have an average pore size of from 1 micrometer (μm) to 200 μm;
    wherein the frozen, porous thin film has an average thickness of from 1 μm to 100 μm; and
    wherein the frozen, porous thin film provides improved cell seeding, cell growth, cell recovery, cell imaging, or a combination thereof relative to a similar film with a thickness greater than 100 μm.

2. The cell culture substrate or platform of claim 1, wherein the plurality of pores have an average pore size that is substantially homogeneous.

3. The cell culture substrate or platform of claim 1, wherein the frozen, porous thin film has an average porosity of 90% or more.

4. The cell culture substrate or platform of claim 1, wherein the continuous phase comprises a polymer, the polymer comprising a biocompatible polymer.

5. The cell culture substrate or platform of claim 1, wherein the continuous phase comprises a polymer selected from the group consisting of chitosan, cellulose, alginate, collagen, gelatin, derivatives thereof, and combinations thereof.

6. The cell culture substrate or platform of claim 1, wherein the continuous phase comprises chitosan or a derivative thereof.

7. A method of making the cell culture substrate or platform of claim 1 by freeze casting.

8. A method of making the cell culture substrate or platform of claim 1, the method comprising: depositing a solution comprising the polymer, the ceramic material, or a combination thereof on a substrate to form a coated substrate and freezing the coated substrate.

9. The method of claim 8, wherein the solution has a concentration of the polymer, the ceramic material, or a combination thereof of from 0.5% to 15% (w/v).

10. The method of claim 8, wherein the solution comprises an aqueous solution.

11. The method of claim 8, wherein depositing the solution comprises depositing from 1 micro liter to 1000 microliters of the solution.

12. The method of claim 8, wherein depositing the solution comprises dip coating, spin coating, brushing, or a combination thereof.

13. The method of claim 8, wherein freezing the coated substrate comprises freezing the coated substrate at a temperature of from 0° C. to −273° C. for an amount of time of from 1 second to 24 hours.

14. The method of claim 8, wherein the method further comprises freeze drying the frozen coated substrate.

15. The method of claim 14, wherein the frozen coated substrate is freeze dried at a temperature of from 0° C. to −120° C. for an amount of time of from 1 minute to 72 hours.

16. The method of claim 8, wherein the method further comprises stabilizing the film after freezing.

17. The method of claim 16, wherein stabilizing the film comprises neutralizing or crosslinking the film.

18. A method of use of the cell culture substrate or platform of claim 1 as a biomaterial substrate, wherein the method comprises implanting the cell culture substrate or platform in vivo.

* * * * *